United States Patent
Zhou et al.

(10) Patent No.: US 11,265,624 B2
(45) Date of Patent: Mar. 1, 2022

(54) HOT VIDEO CLIP EXTRACTION METHOD, USER EQUIPMENT, AND SERVER

(71) Applicant: HUAWEI TECHNOLOGIES CO., LTD., Shenzhen (CN)

(72) Inventors: Pengfei Zhou, Shenzhen (CN); Yinyan Tan, Dongguan (CN); Fangshan Wang, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 99 days.

(21) Appl. No.: 16/495,175

(22) PCT Filed: Jan. 23, 2018

(86) PCT No.: PCT/CN2018/073852
§ 371 (c)(1),
(2) Date: Sep. 18, 2019

(87) PCT Pub. No.: WO2018/171325
PCT Pub. Date: Sep. 27, 2018

(65) Prior Publication Data
US 2021/0120319 A1 Apr. 22, 2021

(30) Foreign Application Priority Data
Mar. 21, 2017 (CN) .......................... 201710171580.4

(51) Int. Cl.
*G11B 17/00* (2006.01)
*H04N 5/93* (2006.01)
(Continued)

(52) U.S. Cl.
CPC ..... *H04N 21/8549* (2013.01); *H04N 21/4882* (2013.01); *H04N 21/4886* (2013.01); *H04N 21/6587* (2013.01); *H04N 21/8126* (2013.01)

(58) Field of Classification Search
CPC .......... H04N 21/8549; H04N 21/4882; H04N 21/3886; H04N 21/6587; H04N 21/8126;
(Continued)

(56) References Cited

U.S. PATENT DOCUMENTS 8,191,097 B1 * 5/2012 Armstrong ........... H04N 21/232 725/91
2002/0184220 A1 * 12/2002 Teraguchi .............. G11B 27/28
(Continued)

FOREIGN PATENT DOCUMENTS

CN 101901619 A 12/2010
CN 102487456 A 6/2012
(Continued)

*Primary Examiner* — Daquan Zhao
(74) *Attorney, Agent, or Firm* — Maier & Maier, PLLC

(57) ABSTRACT

A system including a server, a first terminal and a second terminal, where the server is configured to: send video content to the first terminal and the second terminal, respectively, where the video content includes a first hot clip and a second hot clip; send a first tag of the first hot clip to the first terminal; and send a second tag of the second hot clip to the second terminal; the first terminal is configured to display the first tag on a play time axis of the video content, where the first tag is located in a first location of the play time axis; and the second terminal is configured to display the second tag on the play time axis of the video content, where the second tag is located in a second location of the play time axis.

13 Claims, 11 Drawing Sheets

(51) Int. Cl.
H04N 21/8549 (2011.01)
H04N 21/488 (2011.01)
H04N 21/6587 (2011.01)
H04N 21/81 (2011.01)
H04N 9/88 (2006.01)

(58) Field of Classification Search
CPC ... H04N 9/80; H04N 9/88; H04N 5/93; G11B 17/00
USPC .......... 386/241, 248, 239, 280, 278
See application file for complete search history.

(56) References Cited

U.S. PATENT DOCUMENTS

| | | | | |
|---|---|---|---|---|
| 2009/0276764 | A1* | 11/2009 | Ghorbani | G06F 8/51 717/148 |
| 2014/0189540 | A1 | 7/2014 | Pead | |
| 2014/0282262 | A1* | 9/2014 | Gregotski | H04N 21/8549 715/838 |
| 2016/0029183 | A1 | 1/2016 | Tofighbakhsh et al. | |
| 2017/0169857 | A1* | 6/2017 | Zhao | G11B 27/10 |
| 2017/0366841 | A1* | 12/2017 | Yuan | H04N 21/8133 |
| 2018/0013983 | A1 | 1/2018 | Chen et al. | |
| 2018/0270527 | A1* | 9/2018 | Depies | H04N 21/84 |
| 2019/0200086 | A1 | 6/2019 | E | |

FOREIGN PATENT DOCUMENTS

| | | |
|---|---|---|
| CN | 104410920 A | 3/2015 |
| CN | 104462376 A | 3/2015 |
| CN | 104936035 A | 9/2015 |
| CN | 104951479 A | 9/2015 |
| CN | 104994425 A | 10/2015 |
| CN | 105516821 A | 4/2016 |
| CN | 105828116 A | 8/2016 |
| CN | 105847993 A | 8/2016 |
| CN | 106028161 A | 10/2016 |
| CN | 106446052 A | 2/2017 |
| CN | 106484858 A | 3/2017 |
| CN | 107105318 A | 8/2017 |

* cited by examiner

HOT VIDEO CLIP EXTRACTION METHOD, USER EQUIPMENT, AND SERVER

This application is a National Stage of International Application No. PCT/CN2018/073852, filed on Jan. 23, 2018, which claims priority to Chinese Patent Application No. 201710171580.4, filed on Mar. 21, 2017. Both of the aforementioned applications are hereby incorporated by reference in their entireties.

FIELD

Embodiments relate to the field of communications technologies, and, in particular, to a hot video clip extraction method, user equipment, and a server.

BACKGROUND

With rapid development of the Internet, more users are watching online network videos. By editing a personal preference of a program at a daemon, a conventional video portal site guides a user to watch a video. Before each video is launched online, the video is watched online several times, and then hot clips of the video are selected manually and a conspicuous title is conceived and marked on a progress bar.

Currently, there are two methods more efficient than manual editing of a hot clip. One method is to extract and identify the hot clips based on a quantity of bullet screens and a bullet screen threshold in a video and the other method is to obtain the user's preference for clips in a current video based on information about operations performed by the user on a video player, for example, determine whether the user likes the clip through a fast-forward or rewind operation. In this way, hot clips are extracted and identified.

However, this leads to the same content displayed on a video page when all users are watching the same video, that is, the identified hot clip is the same. However, user groups of different ages, genders, educational backgrounds, and regions may like to watch different themes, clips, or plots of videos. Therefore, different user groups need to access different hot video clips. The foregoing methods are more efficient than manual editing of hot clips, but hot video clips that different user groups intend to watch cannot be extracted for the different user groups. Therefore, accuracy of accessing hot clips by users is low, and hot clips belonging to some user groups cannot be extracted or presented to users.

SUMMARY

Embodiments may implement a hot video clip extraction method, user equipment, and a server to increase accuracy of accessing a hot clip, by a user and assist in extracting or presenting hot clips to the user.

According to an exemplary embodiment, a hot video clip extraction method may be provided, including: classifying, by a server, users into a number of user groups based on attribute information of the users; obtaining, based on information about operations performed by each of the number of user groups in watching video content, a hot clip of the video content watched by each user group, obtaining a tag of the hot clip corresponding to each user group based on the hot clip of the video content watched by each user group, and sending the tag of the hot clip corresponding to each user group to user equipment of the corresponding user group. The embodiments can extract and present personalized hot clips corresponding to a number of user groups, and improve accuracy of accessing the hot clip by a user. Compared with the prior art in which a same hot clip is presented to all users, the embodiments can extract and present obscured hot clips that belong to some user groups.

In a possible embodiment, the classifying, by a server, of users into a number of user groups based on attribute information of the users includes: analyzing, by the server, the attribute information of the users based on a clustering algorithm, to classify the users into the number of user groups; and the analyzing, by the server, the attribute information of the users based on a clustering algorithm, to classify the users into the number of user groups may include: constructing, by the server, an attribute vector of each user based on the attribute information of the users; obtaining a Euclidean distance between the attribute vector of the user and a centroid; and allocating, based on the Euclidean distance, the user into a cluster with a centroid located at a shortest Euclidean distance, where each cluster corresponds to a user group. Therefore, the users may be classified into a number of user groups based on attributes, so that each user group may be presented with a relevant hot clip. There may be a variety of attributes herein such as ages, genders, and occupations of the users.

In a possible embodiment, the obtaining, by the server based on information about operations performed by each of the number of user groups in watching video content, of a hot clip of the video content watched by each user group includes: obtaining, by the server for each user group, a bullet screen comment threshold or a popularity contribution threshold for a hot clip of the user group based on operation information of the user group, and obtaining, by the server for each user group, the hot clip of the user group based on the bullet screen comment threshold and the operation information of the user group, or obtaining, by the server, the hot clip of the user group based on the popularity contribution threshold and the operation information of the user group. In this embodiment, the operation information of a user is feedback data of the user on watched video content, and the feedback data may include explicit feedback or implicit feedback of the user on the video content. The explicit feedback may be, for example, a real-time bullet screen comment made by the user on a video clip of the watched video content. The implicit feedback may be, for example, an operation performed by the user on a video player, dragging a progress bar back and forth or clicking a fast forward button or a rewind button, and clicking, browsing or adding to favorites online video content, to reflect the user's preference for the video content and enable the server to obtain the hot clip corresponding to each user group for a number of user groups.

In a possible embodiment, the obtaining, by the server for each user group, of a bullet screen comment threshold for a hot clip of the user group based on operation information of the user group includes: obtaining, by the server for each user group, a ratio of a quantity of historical bullet screen comments of the user group on the video content to a quantity of video clips of the video content, and then obtaining a product of the ratio and a preset coefficient, where the product is the bullet screen comment threshold for the hot clip of the user group, and obtaining, by the server, the hot clip of the user group based on the bullet screen comment threshold and the operation information of the user group by: determining, by the server for each user group when the server determines that a quantity of bullet screen comments of the user group on any video clip of the video content is greater than the bullet screen comment threshold, that the video clip is the hot clip of the user group. When the quantity of bullet screen comments of each user group on a video clip is greater than an average quantity of bullet screens made by the user group on all video clips, the server may determine that the video clip is the hot clip of the user group.

In a possible embodiment, the obtaining, by the server, of a tag of the hot clip corresponding to each user group based on the hot clip of the video content watched by each user group includes: constructing, by the server for the hot clip of each user group, a keyword vocabulary of the hot clip, where the keyword vocabulary includes keywords of bullet screen comments on the hot clip, counting a term frequency of each term in the keyword vocabulary, determining a keyword of a highest term frequency, and determining that the keyword of the highest term frequency and a start time and an end time of comments of the user group on the hot clip are a tag of the hot clip. Therefore, on a user equipment side, when each user group watches the video content, the hot clip in which each user group is interested can be accurately identified based on the keyword and the tag of the hot clip, so that the hot clip is personalized between user groups, and the tag of the same hot clip is never obtained by all user groups.

In a possible embodiment, if the operation information of the user group is historical operation information of operations performed by the user on the player, the obtaining, by the server for each user group, a popularity contribution threshold for a hot clip of the user group based on operation information of the user group includes determined by: obtaining, by the server for each user group, a duration of each operation type of each user, where the operation type includes fast forward, rewind, forward drag, and backward drag; obtaining, by the server for each user in each user group, a popularity contribution value of each operation type of the user, where the popularity contribution value is a ratio of a product of duration of the operation type and a weighted value of the operation type, to duration of a video clip corresponding to the operation type; and obtaining, by the server for each user group, the popularity contribution threshold for the hot clip of the user group, where the popularity contribution threshold is a product of a ratio of a total popularity contribution value of the user group to a quantity of video clips of the video content, and a preset coefficient; and the obtaining, by the server for each user group, the hot clip of the user group based on the popularity contribution threshold and the operation information of the user group includes: obtaining, by the server for each user group, a sum of popularity contribution values of the user group for each video clip of the video content, and determining that a video clip whose sum of popularity contribution values is greater than the popularity contribution threshold is the hot clip of the user group. Because a level of interest of the user in a video clip can be reflected by fast-forwarding, rewinding, dragging forward, or dragging backward performed by the user on the player when playing the video clip, a different hot clip can be presented to each user group after the hot clip of each user group is obtained, thereby improving accuracy of accessing the hot clip by the user and extracting obscured hot clips belonging to some user groups.

In a possible embodiment, the obtaining, by the server, a tag of the hot clip corresponding to each user group based on the hot clip of the video content watched by each user group includes: determining, by the server for the hot clip of each user group, that an earliest time point and a latest time point of all time points of operations performed by the user group on a player when playing the hot clip are a tag of the hot clip. Therefore, based on the tag of the hot clip corresponding to each user group, each user group can quickly locate the hot clip in which each user group is interested.

In a possible embodiment, before the server classifies users into different user groups based on attribute information of the users who watch video content, the method further includes: receiving, by the server, the attribute information of the users sent by the user equipment. The attribute information may be obtained from registration information of the user in the user equipment or obtained from registration information of the user in a client, or may be obtained by other means. This is not limited in this embodiment.

According to another aspect, a hot video clip extraction method is provided, including: sending, by user equipment, attribute information of a user to a server; and receiving, by the user equipment, a tag that is of a hot clip of video content and that is sent by the server, and displaying the tag of the hot clip in a display part of the video content based on the tag. When the user watches the video content, information about operations performed by the user when watching the video content and service data are sent to the server. The service data may be expressed in a form of a time sequence. Each piece of service data may include a session identifier (session ID), a user account, a start time of playing a video, an end time of the video, a play type, a video type, and a video ID. Therefore, based on the attribute information of the user, the information about the operations performed by the user when watching the video content, and the service data, the server can obtain the hot clip of the video content watched by each user group, obtain the tag of the hot clip of each user group, and send the tag to the user equipment, so that the user equipment of each user group can present a tag of a personalized hot clip, accuracy of accessing the hot clip by the user is improved, and obscured hot clips belonging to some user groups can be presented.

In a possible embodiment, the tag includes a keyword of the hot clip and a start time and an end time of comments made on the hot clip by a user group to which the user belongs, or the tag may include an earliest time point and a latest time point of all time points of operations performed by the user group to which the user belongs, on a player when playing the hot clip.

According to still another embodiment, a server is provided, including: a classification unit, configured to classify users into a number of user groups based on attribute information of the users; an obtaining unit, configured to obtain, based on information about operations performed by each of the number of user groups classified by the classification unit in watching video content, a hot clip of the video content watched by each user group, where the obtaining unit is further configured to obtain a tag of the hot clip corresponding to each user group based on the hot clip that is obtained by the obtaining unit and that is of the video content watched by each user group; and a sending unit, configured to send the tag that is obtained by the obtaining unit and that is of the hot clip corresponding to each user group to user equipment of the corresponding user group.

In a possible embodiment, the classification unit is configured to analyze the attribute information of the users based on a clustering algorithm to classify the users into the number of user groups. The classification unit may construct an attribute vector of each user based on the attribute information of the users, obtain a Euclidean distance between the attribute vector of the user and a centroid, and allocate, based on the Euclidean distance, the user into a cluster with a centroid located at a shortest Euclidean distance, where each cluster corresponds to a user group.

In a possible embodiment, the obtaining unit is configured to: obtain, for each user group, a bullet screen comment threshold or a popularity contribution threshold for a hot clip of the user group based on operation information of the user group, and obtain, for each user group, the hot clip of the user group based on the bullet screen comment threshold and the operation information of the user group, or obtain the hot clip of the user group based on the popularity contribution threshold and the operation information of the user group.

In a possible embodiment, the obtaining unit is configured to: obtain, for each user group, a ratio of a quantity of historical bullet screen comments of the user group on the video content to a quantity of video clips of the video content, and then obtain a product of the ratio and a preset coefficient, where the product is the bullet screen comment threshold for the hot clip of the user group, and determine, for each user group when it is determined that a quantity of bullet screen comments of the user group on any video clip of the video content is greater than the bullet screen comment threshold, that the any video clip is the hot clip of the user group.

In a possible embodiment, for the hot clip of each user group, a keyword vocabulary of the hot clip is constructed, where the keyword vocabulary includes keywords of bullet screen comments on the hot clip; and a term frequency of each term in the keyword vocabulary is counted for the hot clip of each user group, a keyword of a highest term frequency is determined, and it is determined that the keyword of the highest term frequency and a start time and an end time of comments of the user group on the hot clip are a tag of the hot clip.

In a possible embodiment, the obtaining unit is configured to: obtain, for each user group, duration of each operation type of each user, where the operation type includes fast forward, rewind, forward drag, and backward drag; obtain, for each user in each user group, a popularity contribution value of each operation type of the user, where the popularity contribution value is a ratio of a product of duration of the operation type and a weighted value of the operation type, to duration of a video clip corresponding to the operation type; obtain, for each user group, the popularity contribution threshold for the hot clip of the user group, where the popularity contribution threshold is a product of a ratio of a total popularity contribution value of the user group to a quantity of video clips of the video content, and a preset coefficient; and obtain, for each user group, a sum of popularity contribution values of the user group for each video clip of the video content, and determine that a video clip whose sum of popularity contribution values is greater than the popularity contribution threshold is the hot clip of the user group.

In a possible embodiment, the obtaining unit is configured to: determine, for the hot clip of each user group, that an earliest time point and a latest time point of all time points of operations performed by the user group on a player when playing the hot clip are a tag of the hot clip.

In a possible embodiment, a receiving unit is further included, and is configured to receive the attribute information of the users sent by the user equipment.

According to yet another embodiment, user equipment is provided, including: a sending unit, configured to send attribute information of a user to a server; a receiving unit, configured to receive a tag that is sent by the server and that is of a hot clip of video content; and a display unit, configured to display the tag of the hot clip in a display part of the video content based on the tag.

In a possible embodiment, the tag includes a keyword of the hot clip and a start time and an end time of comments made on the hot clip by a user group to which the user belongs, or the tag includes an earliest time point and a latest time point of all time points of operations performed by the user group to which the user belongs, on a player when playing the hot clip.

Another embodiment provides a computer storage medium, configured to store computer software instructions used by the foregoing Internet of Things server. The computer storage medium contains a program designed for executing the foregoing aspects.

Another embodiment provides a computer storage medium, configured to store computer software instructions used by the foregoing server. The computer storage medium contains a program designed for executing the foregoing aspects.

The embodiments provide a hot video clip extraction method, user equipment, and a server. A server classifies users into a number of user groups based on attribute information of the users; obtains, based on information about operations performed by each of the number of user groups in watching video content, a hot clip of the video content watched by each user group; and obtains a tag of the hot clip corresponding to each user group based on the hot clip of the video content watched by each user group, and sends the tag of the hot clip corresponding to each user group to user equipment of the corresponding user group. In this way, the embodiments can extract and present a personalized hot clip for each of a number of user groups, and improve accuracy of accessing the hot clip by a user. Compared with the prior art in which a same hot clip is presented to all users, the embodiments can extract and present obscured hot clips that belong to some user groups.

DESCRIPTION OF EMBODIMENTS

Embodiments described herein are applicable to scenarios in which user equipment of a different user group presents a different hot clip to a user, so as to implement personalized presenting of hot clips to different user groups.

Figure 1:
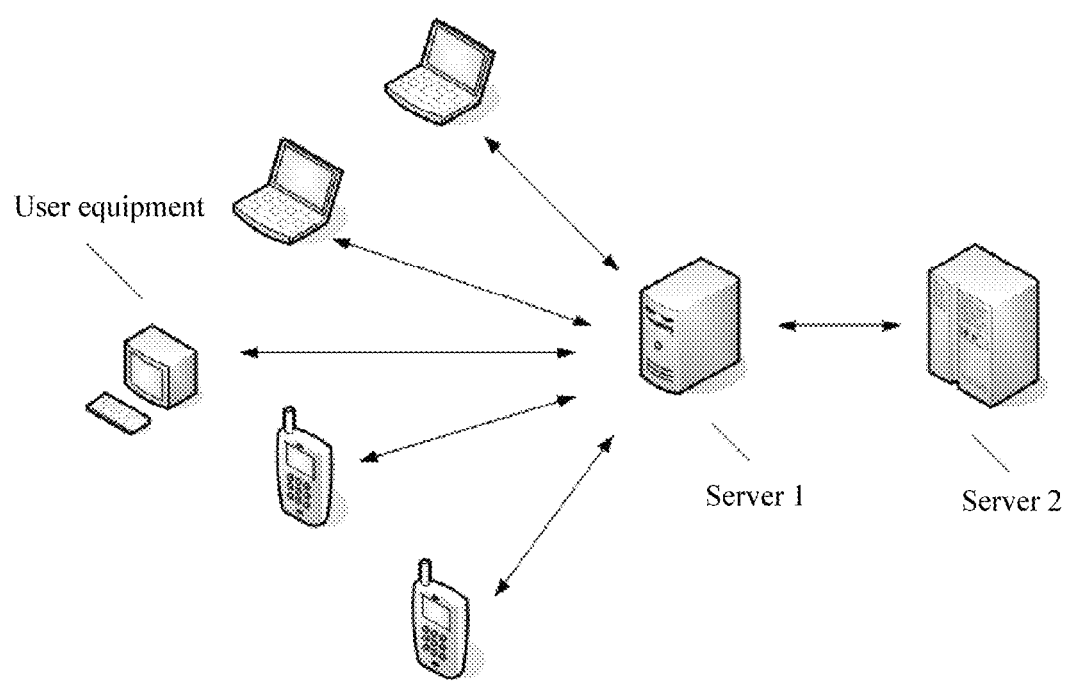
FIG. 1 is a schematic diagram of a system architecture according to an embodiment.

A system architecture in various embodiments may include user equipment and a server, and a quantity of user equipment may be more than one. Different method processes may be executed between servers interactively. FIG. 1 is a schematic architectural diagram of a system architecture that includes a number of user equipment, a server 1, and a server 2. The user equipment may be any one of the following types that have a display screen, and the user equipment may be static or mobile. The user equipment may include, but is not limited to, a personal computer, a laptop computer, a tablet computer, a netbook, a mobile terminal, a handheld device, a cordless phone, a smart watch, or a pair of smart glasses. The server 1 and the server 2 may be physical cluster servers, virtual cloud servers, or other server types as is known in the art.

Figure 2:
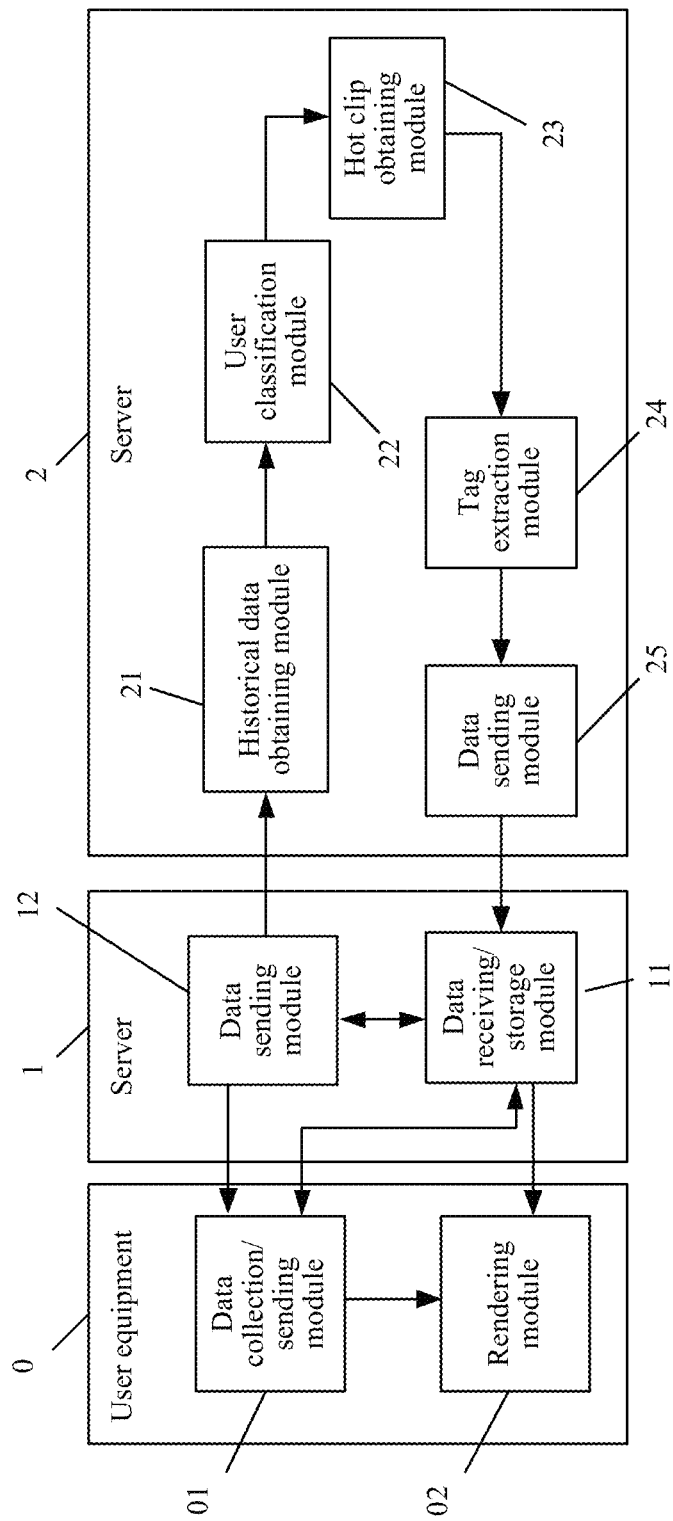
FIG. 2 is a schematic diagram of function modules of a system architecture according to an embodiment.

In an exemplary embodiment and as shown in FIG. 2, if a system architecture includes user equipment 0, a server 1, and a server 2, each user equipment 0 may include a data collection/sending module 01 and a presenting module 02 The server 1 may include a data receiving/storage module 11 and a data sending module 12. The server 2 may include a historical data obtaining module 21, a user classification module 22, a hot clip obtaining module 23, a tag extraction module 24, and a data sending module 25. The data collection/sending module 01 and the presenting module 02 may be implemented in different applications for different clients of the user equipment. The data collection/sending module 01 for the clients may be configured to collect attribute information of a user who watches video content, and send the attribute information to the server 1. The data receiving/storage module 11 in the server 1 may be configured to receive from each client and store the attribute information of a number of users who watch the video content. The data sending module 12 sends aggregated attribute information of the users to the server 2. The historical data obtaining module 21 in the server 2 is configured to receive the attribute information of the number of users. The user classification module 22 is may be configured to classify the number of users based on the attribute information of the number of users, and obtain a number of user groups. The hot clip obtaining module 23 is configured to obtain a hot clip for each user group based on information about operations performed by each user group on the video content when watching the video content. The tag extraction module 24 is configured to obtain a tag of the hot clip corresponding to each user group based on the hot clip of each user group, and send the tag of the hot clip of each user group to the server 1 through the data sending module 25. After the data receiving/storage module 11 in the server 1 receives the tag of the hot clip of each user group, the user equipment of the user who watches the video content receives the tag of the hot clip sent by the server 1 through the data sending module 12. The tag of the hot clip presented by the presenting module in the user equipment of a different user group may be different. In this way, some obscured hot clips belonging to some user groups can be extracted, and accuracy of accessing the hot clips by different user groups is improved. If the system architecture has one server, functions of the server 1 and the server 2 may be integrated into the one server.

Figure 3A:
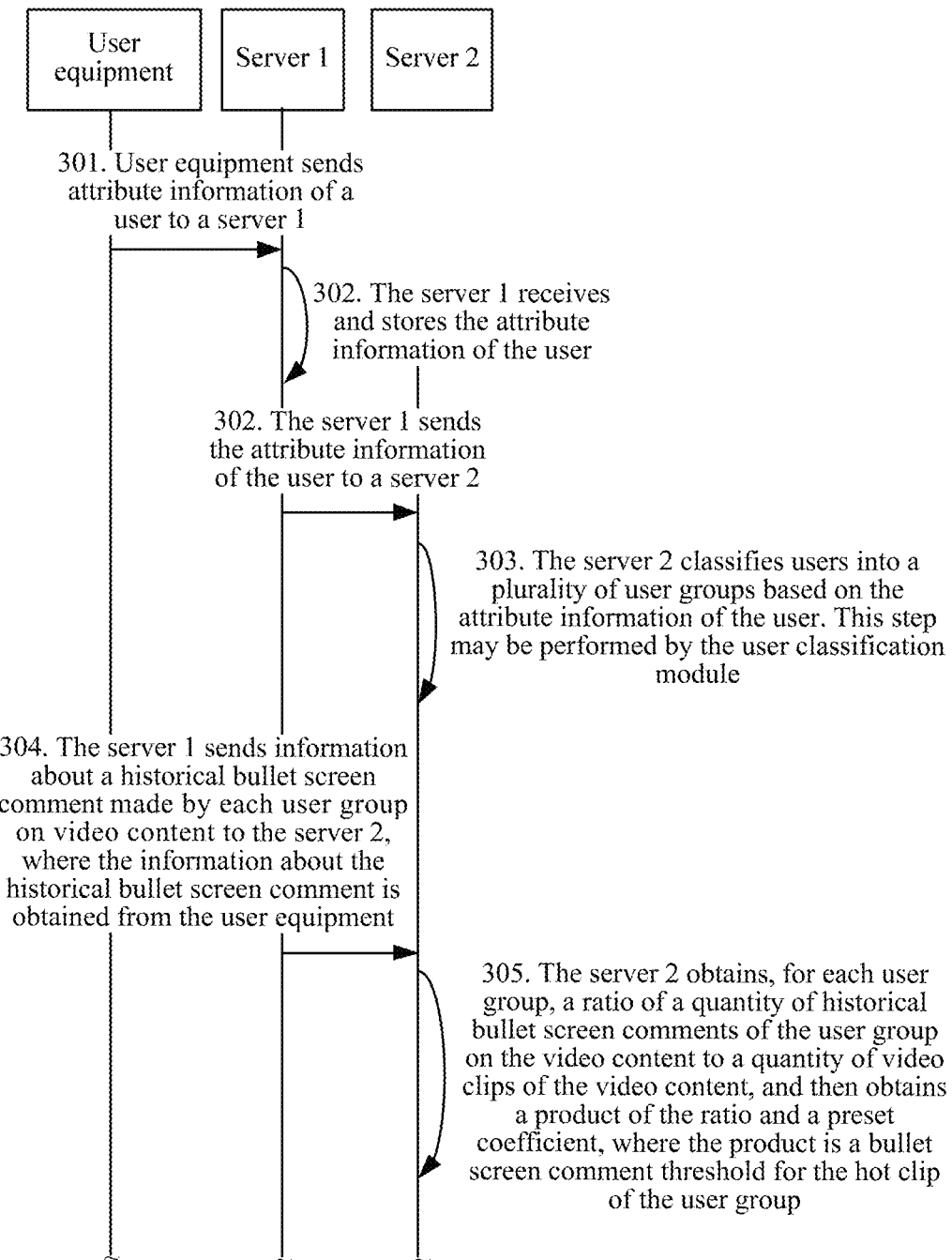
FIG. 3A and FIG. 3B are a schematic flowchart of a hot video clip extraction method according to an embodiment.
Figure 3B:
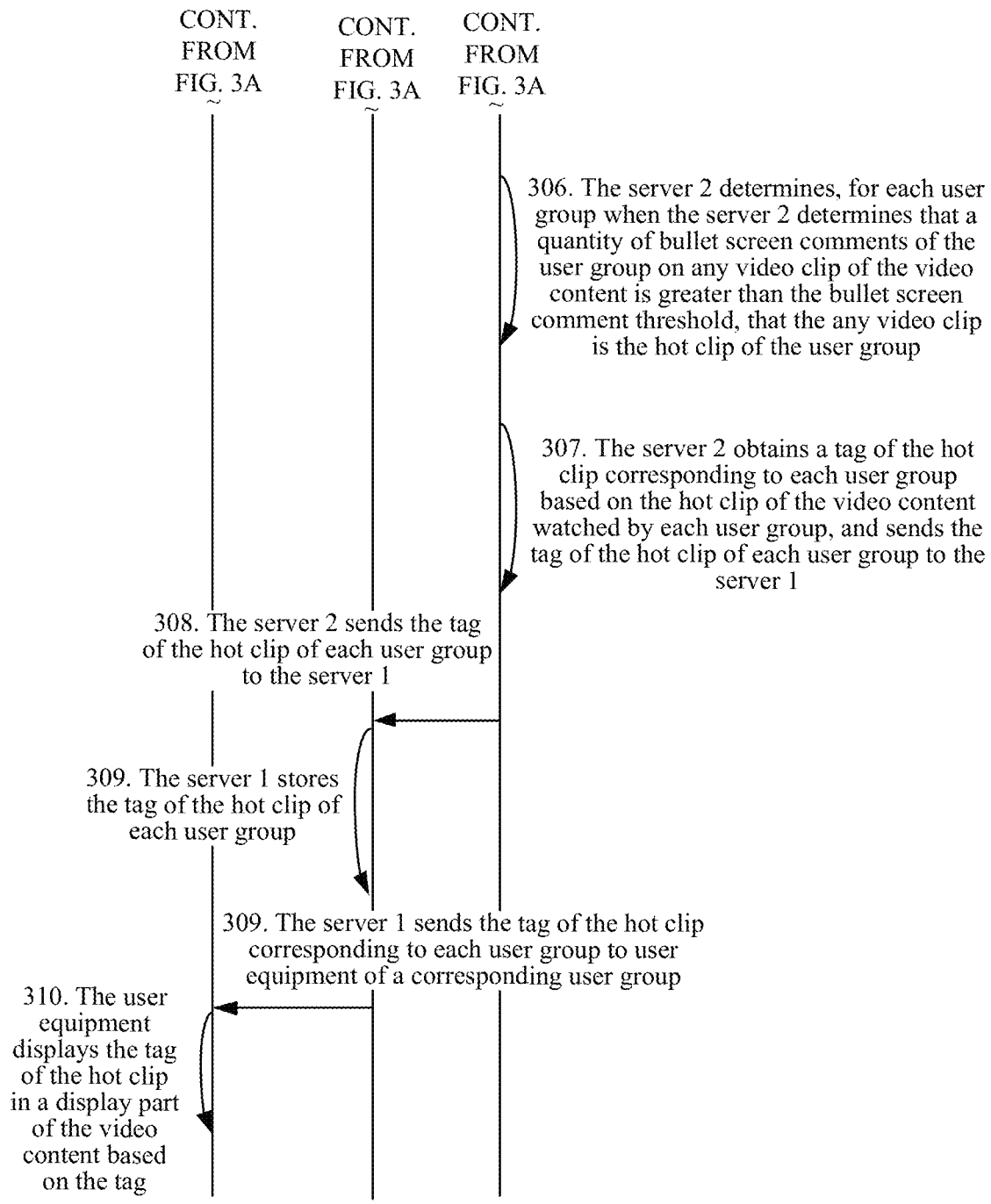

The following describes an example in which the information about operations performed by each user group on the video content is information about a historical bullet screen comment. An embodiment provides a hot video clip extraction method. As shown in FIG. 3A and FIG. 3B, the method includes the following steps.

In step 301, user equipment sends attribute information of a user to a server 1.

The attribute information sent by the user equipment may be understood as registration information of the user on a client, or other registration information of the user, including a user identifier (identification, ID), age, gender, and occupation. The attribute information of different users may be the same or different. The user ID may be an account registered by the user on the client, for example, a mobile number, or an email address, or a character string. This step may be performed by the data collection/sending module 01.

In step 302, the server 1 receives and stores the attribute information of the user and sends the attribute information of the user to a server 2.

When receiving the attribute information of the user of each user equipment, the server 1 aggregates the received attribute information of different users by using, for example, the data receiving/storage module 11, and then the aggregated attribute information of each user is sent to the server 2 by using the data sending module 12. The server 2 may receive the attribute information of each user by using the historical data obtaining module 21. For example, the attribute information of the users aggregated by the server 1 is shown in Table 1.

TABLE 1

| User ID | Age | Gender | Occupation | XX (extensible) | ... |
|---|---|---|---|---|---|
| 001 | 10 | Male | Student | | |
| 002 | 8 | Female | Student | | |
| 003 | 12 | Female | Student | | |
| 004 | 22 | Male | Student | | |
| 005 | 50 | Male | Civil servant | | |
| 006 | 9 | Female | Student | | |
| 007 | 25 | Male | Engineer | | |
| 008 | 27 | Female | Nurse | | |
| 009 | 26 | Male | Engineer | | |
| 010 | 23 | Male | Student | | |
| 011 | 21 | Female | Student | | |
| 012 | 44 | Female | Teacher | | |
| 013 | 11 | Male | Student | | |
| 014 | 25 | Male | Lawyer | | |
| 015 | 47 | Male | Civil servant | | |
| 016 | 49 | Female | Teacher | | |

In step 303, the server 2 classifies users into a number of user groups based on the attribute information of the user. This step may be performed by the user classification module 22.

In a possible implementation, the server 2 may simply classify the users based on the attributes such as the age and gender of the user. For example, the server 2 may classify the users by age into: a child user watching group, a teenaged or young adult user watching group, and a middle-aged and elderly user watching group.

In another possible implementation, the server 2 may use a clustering algorithm to classify the users based on the attribute information of the user. For example, the server 2 may use a K-Means clustering algorithm. The following describes an example in which the K-Means clustering algorithm is used.

1) The Server 2 Constructs an Attribute Vector of Each User Based on the Attribute Information of the Users.

For example, the constructed attribute vector of the user may be: [age, gender, occupation], where the age attribute may directly serve as a value in a corresponding place in the attribute vector of the user; in the gender attribute, "male" may have a value of 1 in the corresponding place in the attribute vector of the user, "female" may have a value of 0 in the corresponding place in the attribute vector of the user; and the value of the occupation attribute in the corresponding place in the attribute vector of the user may be a value of a term frequency vector of the occupation attribute. Herein, the term frequency vector of the occupation attribute may be constructed in the following process: ① constructing a vocabulary: constructing a vocabulary by using all terms appearing in the occupation attribute, for example, the vocabulary may be [student, civil servant, engineer, nurse, teacher, lawyer]; and ② constructing a term frequency vector using the term frequency of each term of the occupation attribute of the user in the vocabulary as the value in the corresponding place in the term frequency vector, where a length of the term frequency vector is a length of the vocabulary.

The attribute vector of the user corresponding to the attribute information of the user aggregated in Table 1 may be shown in Table 2.

age attribute is 10, the value of the gender attribute is 1, and "occupation" is in the first place in the vocabulary. That is, the term frequency of "student" is 1, and values of other term frequencies are 0. Therefore, the value of the term frequency vector corresponding to the occupation attribute of the user is [1,0,0,0,0,0].

2) The Server 2 Obtains a Euclidean Distance Between the Attribute Vector of the User and a Centroid.

The server 2 may first randomly specify user IDs 001, 007, and 015 located at three centroids of K-Means respectively, and then calculate the Euclidean distance between the attribute vector of each user and each centroid based on a preset Euclidean distance formula. For example, the Euclidean distance between the attribute vector [8,0,1,0,0,0,0,0] of the user having a user ID 002 and the attribute vector [8,0,1,0,0,0,0,0] of a centroid (that is, the user having an ID 001) is:

$$\sqrt{(8-10)^2 + (0-1)^2 + (1-1)^2 + (0-0)^2 + (0-0)^2 + (0-0)^2 + (0-0)^2 + (0-0)^2} = 2.2$$

Based on this calculation method, the Euclidean distance between the attribute vector of each user and each centroid may be shown in Table 3.

TABLE 3

| User ID | 001 | 002 | 003 | 004 | 005 | 006 | 007 | 008 | 009 | 010 | 011 | 012 | 013 | 014 | 015 | 016 |
|---|---|---|---|---|---|---|---|---|---|---|---|---|---|---|---|---|
| 001 | 0.0 | 2.2 | 2.2 | 12.0 | 40.0 | 1.4 | 15.1 | 17.1 | 16.1 | 13.0 | 11.0 | 34.0 | 1.0 | 15.1 | 37.0 | 39.0 |
| 007 | 15.1 | 17.1 | 13.1 | 3.3 | 25.0 | 16.1 | 0.0 | 2.6 | 1.0 | 2.4 | 4.4 | 19.1 | 14.1 | 1.4 | 22.0 | 24.1 |
| 015 | 37.0 | 39.0 | 35.0 | 25.0 | 3.0 | 38.0 | 22.0 | 20.1 | 21.0 | 24.0 | 26.1 | 3.5 | 36.0 | 22.0 | 0.0 | 2.6 |

Euclidean distance between the attribute vector of the user and the centroid

TABLE 2

Attribute vector of the user

| User ID | Age | Gender | Occupation | Attribute vector of the user |
|---|---|---|---|---|
| 001 | 10 | Male | Student | [10,1,1,0,0,0,0,0] |
| 002 | 8 | Female | Student | [8,0,1,0,0,0,0,0] |
| 003 | 12 | Female | Student | [12,0,1,0,0,0,0,0] |
| 004 | 22 | Male | Student | [22,1,1,0,0,0,0,0] |
| 005 | 50 | Male | Civil servant | [50,1,0,1,0,0,0,0] |
| 006 | 9 | Female | Student | [9,0,1,0,0,0,0,0] |
| 007 | 25 | Male | Engineer | [25,1,0,0,1,0,0,0] |
| 008 | 27 | Female | Nurse | [27,0,0,0,0,1,0,0] |
| 009 | 26 | Male | Engineer | [26,1,0,0,1,0,0,0] |
| 010 | 23 | Male | Student | [23,1,1,0,0,0,0,0] |
| 011 | 21 | Female | Student | [21,0,1,0,0,0,0,0] |
| 012 | 44 | Female | Teacher | [44,0,0,0,0,0,1,0] |
| 013 | 11 | Male | Student | [11,1,1,0,0,0,0,0] |
| 014 | 25 | Male | Lawyer | [25,1,0,0,0,0,0,1] |
| 015 | 47 | Male | Civil servant | [47,1,0,1,0,0,0,0] |
| 016 | 49 | Female | Teacher | [49,0,0,0,0,0,1,0] |

Taking a user having an ID 001 as an example, his age is 10, his gender is male, and his occupation is student. Therefore, in the attribute vector of the user, the value of the Based on the calculated Euclidean distance between the attribute vector of each user and each centroid, each user is allocated into a cluster with a centroid located at a shortest distance, where each cluster corresponds to a user group. For example, the Euclidean distance between the user having the ID 002 and the centroid [user ID 001] is 2.2, the Euclidean distance between the user having the ID 002 and the centroid [user ID 007] is 17.1, and the Euclidean distance between the user having the ID 002 and the centroid [user ID 015] is 39.0. Therefore, the user having the ID 002 is allocated into the cluster with the centroid [user ID 001]. That is, the user having the ID 002 belongs to the user group 1 that includes [user ID 001]. Therefore, the three clustered user groups (userGroup1, usergroup2, and usergroup3) may be shown in Table 4 below.

TABLE 4

Clustered user groups

| | User ID | Distance to centroid |
|---|---|---|
| userGroup1 (centroid: 001) | 001 | 0.0 |
| | 002 | 2.2 |
| | 003 | 2.2 |
| | 006 | 1.4 |
| | 013 | 1.0 |
| usergroup2 (centroid: 007) | 004 | 3.3 |
| | 007 | 0.0 |

TABLE 4-continued

Clustered user groups

| | User ID | Distance to centroid |
|---|---|---|
| | 008 | 2.6 |
| | 009 | 1.0 |
| | 010 | 2.4 |
| | 011 | 4.4 |
| | 014 | 1.4 |
| usergroup3 | 005 | 3.0 |
| (centroid: 015) | 012 | 3.5 |
| | 015 | 0.0 |
| | 016 | 2.6 |

Subsequently, after the server 2 classifies the users into a number of user groups based on the attribute information of the user, the server 1 may obtain, based on information about operations performed by each of the number of user groups when watching the video content, a hot clip of the video content watched by each user group. An exemplary implementation may be: for each user group, the server 2 obtains a bullet screen comment threshold for the hot clip of the user group based on the operation information of the user group, and then obtains the hot clip of the user group based on the bullet screen comment threshold and the operation information of the user group.

Referring to the exemplary method in FIG. 3, FIG. 3 describes an example in which the information about operations performed by each user group on the video content is information about a historical bullet screen comment made by the user on the video content.

In step 304, the server 1 sends information about a historical bullet screen comment made by each user group on video content to the server 2, where the information about the historical bullet screen comment is obtained from the user equipment.

The server 1 may obtain, from a client of the user equipment, information about a historical bullet screen comment made by each user on each piece of video content, where registration information is collected from the information about the historical bullet screen comment, and the information about the historical bullet screen comment may be information about a bullet screen comment generated within a preset time period after the video content is launched online; and then send to the server 2 the information about the bullet screen comment made by each user group on the video content in the preset time period. The information about the historical bullet screen comment may include a video ID of the video content commented by each user ID, a video clip ID, a play time point at the time of commenting the video, and a bullet screen comment. Taking information about a bullet screen comment made by each user group in watching a Spring Festival Gala video as an example, information about bullet screen comments made by users on a Spring Festival Gala may be shown in Table 5.

TABLE 5

Information about bullet screen comments made by users in watching a Spring Festival Gala video

| Video clip | Video ID | User ID | Play time point (s) | Bullet screen comment |
|---|---|---|---|---|
| TFboys | XX | 001 | 10.11 | TFboys, so cute. |
| | XX | 001 | 50.23 | Haha, TFboys sings well. |
| | XX | 002 | 105.45 | Gee, TFboys has grown up. |

TABLE 5-continued

Information about bullet screen comments made by users in watching a Spring Festival Gala video

| Video clip | Video ID | User ID | Play time point (s) | Bullet screen comment |
|---|---|---|---|---|
| | XX | 004 | 200.22 | Wang Junkai is so handsome! |
| | XX | 005 | 250.31 | Good performance of the kids. |
| Jay Chou | XX | 006 | 305.46 | Wow, Jay Chou finally shows up. |
| | XX | 007 | 350.54 | Oh, good, Jay! |
| | XX | 008 | 410.34 | Hahaha, I like Jay's talent. |
| | XX | 007 | 425.42 | Grew up with Jay's songs |
| | XX | 010 | 460.26 | Jay's Blue & White Porcelain, of typical Chinese style |
| | XX | 011 | 507.49 | Jay, how many times have you shown on the Spring Festival Gala? |
| | XX | 012 | 560.51 | Jay, do a magic trick |
| Song Zuying | XX | 013 | 609.37 | Wow, Song Zuying sang well in the Spring Festival Gala. |
| | XX | 014 | 620.32 | It is a national treasure. |
| | XX | 015 | 780.53 | Song Zuying still looks so young! |
| | XX | 016 | 850.25 | Song Zuying is a real singer. |

It should be noted that each user in the finally classified user group in step 303 does not necessarily make a comment on the Spring Festival Gala video; and in step 304, only the information about the historical bullet screen comment of the user who commented on the Spring Festival Gala video is extracted, and the same user may comment repeatedly on the same video content.

In step 305, the server 2 obtains, for each user group, a ratio of a quantity of historical bullet screen comments of the user group on the video content to a quantity of video clips of the video content, and then obtains a product of the ratio and a preset coefficient, where the product is the bullet screen comment threshold for the hot clip of the user group.

Based on each user group classified in step 303, the information about the historical bullet screen comment on the video content is grouped, that is, regardless of which video clip is commented on by a user, the information about the historical bullet screen comment of the user is classified into the user group to which the user belongs. For example, the comment made by the user 001 on the video content of the Spring Festival Gala video ID at 10.11 s of the video content is "TFboys, so cute". Therefore, this bullet screen comment may be classified into the user group userGroup1 to which the user ID 001 belongs, and the grouped information about the bullet screen comment may be shown in Table 6.

TABLE 6

Grouped information about a bullet screen comment

| | User ID | Play time point (s) | Bullet screen comment |
|---|---|---|---|
| user Group1 | 001 | 10.11 | TFboys, so cute. |
| | 001 | 50.23 | Haha, TFboys sings well. |
| | 002 | 105.45 | Gee, TFboys has grown up. |
| | 006 | 305.46 | Wow, Jay Chou finally shows up. |
| | 013 | 609.37 | Wow, Song Zuying sang well in the Spring Festival Gala. |
| user group2 | 004 | 200.22 | Wang Junkai is so handsome! |
| | 007 | 350.54 | Oh, good, Jay! |
| | 008 | 410.34 | Hahaha, I like Jay's talent. |
| | 007 | 425.42 | Grew up with Jay's songs |

TABLE 6-continued

Grouped information about a bullet screen comment

|  | User ID | Play time point (s) | Bullet screen comment |
|---|---|---|---|
|  | 010 | 460.26 | Jay's Blue & White Porcelain, of typical Chinese style |
|  | 011 | 507.49 | Jay, how many times have you shown on the Spring Festival Gala? |
|  | 014 | 620.32 | It is a national treasure. |
| user group3 | 005 | 250.31 | Good performance of the kids. |
|  | 012 | 560.51 | Jay, do a magic trick |
|  | 015 | 780.53 | Song Zuying still looks so young! |
|  | 016 | 850.25 | Song Zuying is a real singer. |

For each user group, a ratio of a quantity of historical bullet screen comments of the user group on the video content to a quantity of video clips of the video content may be obtained based on the grouped information about the bullet screen comment, and then a product of the ratio and a preset coefficient is obtained, where the product is the bullet screen comment threshold for the hot clip of the video content watched by the user group, and the preset coefficient may be a hyperparameter and may be set according to required popularity of the hot clip. For example, as shown in exemplary Table 6, the preset coefficient is 1, the bullet screen comment threshold for the hot clip of the video content watched by user Group 1 is equal to 5/3=1.7, the bullet screen comment threshold for the hot clip of the video content watched by user Group 2 is equal to 7/3=2.3, and the bullet screen comment threshold for the hot clip of the video content watched by user Group 3 is equal to 4/3=1.3, as shown in Table 7.

TABLE 7

Threshold for the hot clip of each user group

|  | User ID | Play time point (s) | Bullet screen comment | Bullet screen comment threshold for the hot clip of each user group |
|---|---|---|---|---|
| user Group1 | 001 | 10.11 | TFboys, so cute. | 1.7 |
|  | 001 | 50.23 | Haha, TFboys sings well. |  |
|  | 002 | 105.45 | Gee, TFboys has grown up. |  |

TABLE 7-continued

Threshold for the hot clip of each user group

|  | User ID | Play time point (s) | Bullet screen comment | Bullet screen comment threshold for the hot clip of each user group |
|---|---|---|---|---|
|  | 006 | 305.46 | Wow, Jay Chou finally shows up. |  |
|  | 013 | 609.37 | Wow, Song Zuying sang well in the Spring Festival Gala. |  |
| user group2 | 004 | 200.22 | Wang Junkai is so handsome! | 2.3 |
|  | 007 | 350.54 | Oh, good, Jay! |  |
|  | 008 | 410.34 | Hahaha, I like Jay's talent. |  |
|  | 007 | 425.42 | Grew up with Jay's songs |  |
|  | 010 | 460.26 | Jay's Blue & White Porcelain, of typical Chinese style |  |
|  | 011 | 507.49 | Jay, how many times have you shown on the Spring Festival Gala? |  |
|  | 014 | 620.32 | It is a national treasure. |  |
| user group3 | 005 | 250.31 | Good performance of the kids. | 1.3 |
|  | 012 | 560.51 | Jay, do a magic trick |  |
|  | 015 | 780.53 | Song Zuying still looks so young! |  |
|  | 016 | 850.25 | is a real singer. |  |

In step 306, the server 2 determines, for each user group when the server 2 determines that a quantity of bullet screen comments of the user group on any video clip of the video content is greater than the bullet screen comment threshold, that the any video clip is the hot clip of the user group.

For any user group, if the quantity of bullet screen comments of the user group on a single video clip is greater than the bullet screen comment threshold for the hot clip of the user group, it is determined that the video clip is the hot clip of the video content watched by the user group. For example, if the quantity of bullet screen comments of the user group 1 on the TFboys video clip is 3, the threshold for the hot clip of the user Group 1 is 1.7, and the quantity "3" of bullet screen comments is greater than the threshold 1.7. Therefore, the TFboys video clip is the hot clip of the user Group 1. The hot clip of each corresponding user group in Table 7 above may be shown in Table 8:

TABLE 8

Hot clip of each user group

|  | Video clip | User ID | Play time point (s) | Bullet screen comment | Hot clip threshold of each user group | Hot clip belonging to each user group |
|---|---|---|---|---|---|---|
| user Group1 | TFboys | 001 | 10.11 | TFboys, so cute. | 1.7 | Total quantity of comments on this video clip is 3, which is greater than the bullet screen comment threshold 1.7, so that the video clip is a hot clip |
|  |  | 001 | 50.23 | Haha, TFboys sings well. |  |  |
|  |  | 002 | 105.45 | Gee, TFboys has grown up. |  |  |
|  | Jay Chou | 006 | 305.46 | Wow, Jay Chou finally shows up. |  |  |

TABLE 8-continued

Hot clip of each user group

|  | Video clip | User ID | Play time point (s) | Bullet screen comment | Hot clip threshold of each user group | Hot clip belonging to each user group |
|---|---|---|---|---|---|---|
|  | Song Zuying | 013 | 609.37 | Wow, Song Zuying sang well in the Spring Festival Gala. |  |  |
| user group2 | TFboys | 004 | 200.22 | Wang Junkai is so handsome! | 2.3 |  |
|  | Jay Chou | 007 | 350.54 | Oh, good, Jay! |  | Total quantity of comments on this video clip is 5, which is greater than the bullet screen comment threshold 2.3, so that the video clip is a hot clip |
|  |  | 008 | 410.34 | Hahaha, I like Jay's talent. |  |  |
|  |  | 007 | 425.42 | Grew up with Jay's songs |  |  |
|  |  | 010 | 460.26 | Jay's Blue & White Porcelain, of typical Chinese style |  |  |
|  |  | 011 | 507.49 | Jay, how many times have you shown on the Spring Festival Gala? |  |  |
|  | Song Zuying | 014 | 620.32 | It is a national treasure. |  |  |
| user group3 | TFboys | 005 | 250.31 | Good performance of the kids. | 1.3 |  |
|  | Jay Chou | 012 | 560.51 | Jay, do a magic trick |  |  |
|  | Song Zuying | 015 | 780.53 | Song Zuying still looks so young! |  | Total quantity of comments on this video clip is 2, which is greater than the bullet screen comment threshold 1.3, so that the video clip is a hot clip |
|  |  | 016 | 850.25 | Song Zuying is a real singer. |  |  |

Steps 304 to 306 may be performed by the hot clip obtaining module 23.

In step 307, the server 2 obtains a tag of the hot clip corresponding to each user group based on the hot clip of the video content watched by each user group, and sends the tag of the hot clip of each user group to the server 1.

For the hot clip of each user group, the server 2 may construct a keyword vocabulary of the hot clip, where the keyword vocabulary includes keywords of bullet screen comments on the hot clip; and then count a term frequency of each term in the keyword vocabulary, determine a keyword of a highest term frequency, and determine that the keyword of the highest term frequency and a start time and an end time of comments of the user group on the hot clip are a tag of the hot clip.

The server 2 may extract keywords of each bullet screen comment by using HanLP, a Java word segmentation package. For example, for the bullet screen comment "TFboys, so cute", the keywords extracted by HanLP may be: "cute" and "TFboys", and therefore, the keywords extracted from each bullet screen comment of each user group may be shown in Table 9. Subsequently, based on the keywords of each bullet screen comment, a keyword vocabulary of each user group is constructed. As shown in Table 9, all keywords corresponding to user Group 1 are: cute, TFboys, sing, good, and grew up. Therefore, the keyword vocabulary corresponding to user Group 1 may be: [cute, TFboys, sing, good, grew up]. Further, the server 2 counts the term frequency of each term in the keyword vocabulary of each user group. For example, in the foregoing keyword vocabulary, the keyword "TFboys" corresponding to the user Group 1 appears three times, and other keywords appear once. Therefore, a term frequency vector corresponding to the user Group 1 is: [1,3,1,1,1]. Based on this term frequency vector, it is determined that the keyword of a highest term frequency is "TFboys". In addition, the start time and the end time of the comments made by the user group on the hot clip TFboys show are 10.11 and 105.45 respectively. Therefore, the tag of the hot clip of the user Group 1 may be "TFboys" and "10.11-105.45".

TABLE 9

Keyword vocabulary, corresponding term frequency, and keyword of highest term frequency

| | Video clip | User ID | Play time point (s) | Bullet screen comment | Extracted keyword | Keyword vocabulary and corresponding term frequency | Keyword of highest term frequency |
|---|---|---|---|---|---|---|---|
| user Group1 | TFboys | 001 | 10.11 | TFboys, so cute. | Cute, TFboys | [Cute, TFboys, sing, good, grew up] [1, 3, 1, 1, 1] | TFboys |
| | | 001 | 50.23 | Haha, TFboys sings well. | Sing, good, TFboys | | |
| | | 002 | 105.45 | Gee, TFboys has grown up. | Grew up, TFboys | | |
| user Group2 | Jay Chou | 007 | 350.54 | Oh, good, Jay! | good, Oh, Jay | [Good, Oh, Jay, like, talent, grew up, Blue & White Porcelain, Chinese, Spring Festival Gala] [1, 1, 5, 1, 1, 1, 1, 1, 1] | Jay |
| | | 008 | 410.34 | Hahaha, I like Jay's talent. | Like, Jay, talent | | |
| | | 007 | 425.42 | Grew up with Jay's songs | Jay, grew up | | |
| | | 010 | 460.26 | Jay's Blue & White Porcelain, of typical Chinese style | Blue & White Porcelain, Chinese, Jay | | |
| | | 011 | 507.49 | Jay, how many times have you shown on the Spring Festival Gala? | Jay, Spring Festival Gala | | |
| user group3 | Song Zuying | 015 | 780.53 | Song Zuying still looks so young! | Song Zuying, look, young | [Song Zuying, look, young, real, singer] [2, 1, 1, 1, 1] | Song Zuying |
| | | 016 | 850.25 | Song Zuying is a real singer. | Song Zuying, real, singer | | |

This step may be performed by the tag extraction module 24.

In step 308, the server 2 sends the tag of the hot clip of each user group to the server 1. This step may be performed by the data sending module 25.

In step 309, the server 1 stores the tag of the hot clip of each user group, and sends the tag of the hot clip corresponding to each user group to user equipment of a corresponding user group.

After the server 1 obtains the tag of the hot clip of each user group, when a user whose registration information is stored in the server 1 watches the video content, the server 1 may send the tag of the hot clip of the video content to the user equipment of the corresponding user group watching the video content. This step may be performed by the data sending module 12.

In step 310, the user equipment displays the tag of the hot clip in a display part of the video content based on the tag.

For example, when intending to play the video content, the user equipment may receive the tag of the hot clip of the video content from the server 1. The user equipment presents the hot clip in a personalized manner based on the received tag.

Figure 4:
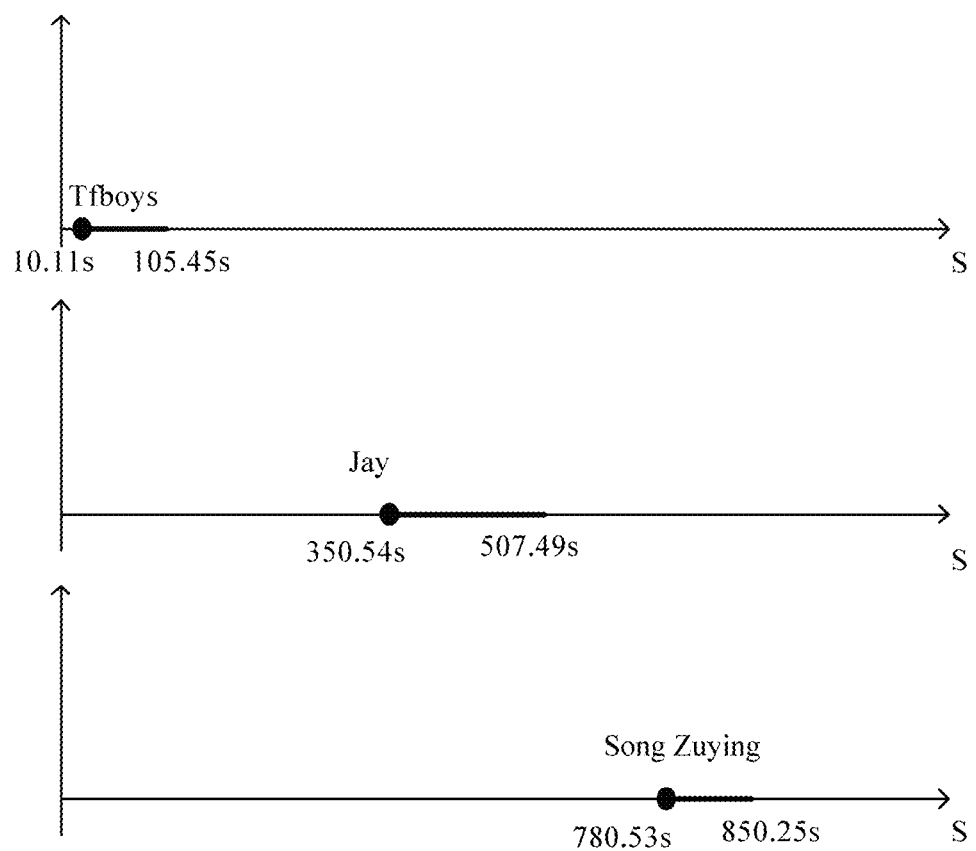
FIG. 4 is a schematic diagram of presenting a different hot clip to each user group according to an embodiment.

In a possible implementation, for the hot clip of each user group, the user equipment may mark a start time of the hot clip on a play time axis based on the start time and end time of the comments made by the user group on the hot clip, and based on the start time and the end time, mark a color distinguishable from that of a non-hot clip in a hot clip section of the play time axis. For example, as shown in FIG. 4, FIG. 4 shows hot clips that are presented according to Table 9 and that are of the Spring Festival Gala video watched by each user group.

Figure 5:
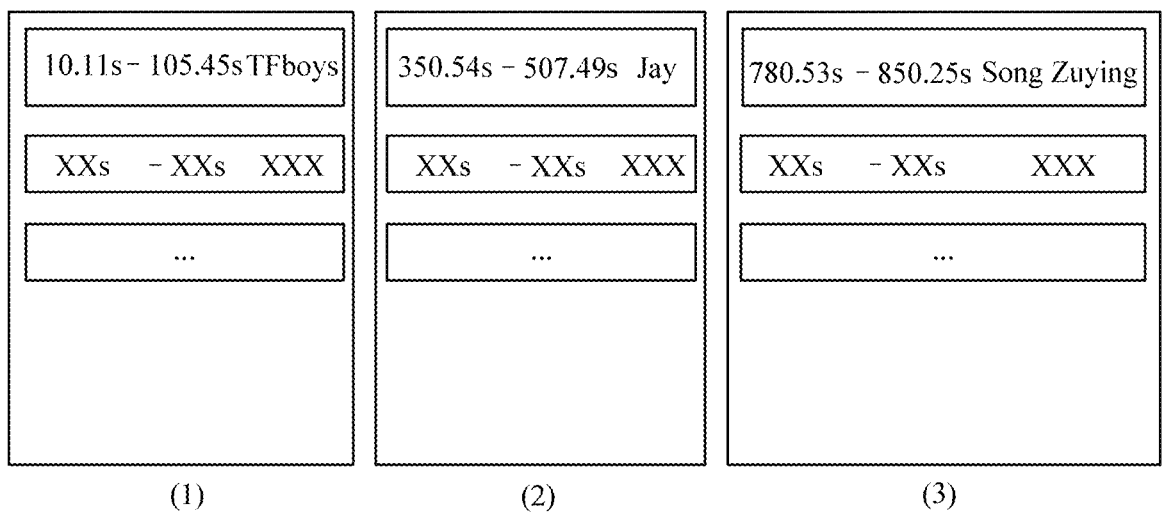
FIG. 5 is a schematic diagram of presenting a different hot clip to each user group according to an embodiment.

In another possible implementation, for the hot clip of each user group, the user equipment may present the hot clip to the user group in a video display area, in a list form, and based on the start time and the end time of the comments made by the user group on the hot clip and the keywords. More than one hot clip may be presented to the same user group. According to the example in Table 9, and referring to the exemplary embodiment in FIG. 5, a list of hot clips presented to the user Group 1, a list of hot clips presented to the user Group 2, and a list of hot clips presented to the user Group 3 may be shown.

This step may be performed by the presenting module 02.

The embodiments can extract and present personalized hot clips corresponding to a number of user groups, and improve accuracy of accessing the hot clip by a user. Compared with the prior art in which a hot clip is presented to all users, the embodiments described herein may extract and present obscured hot clips that are relevant to some user groups.

Figure 6A:
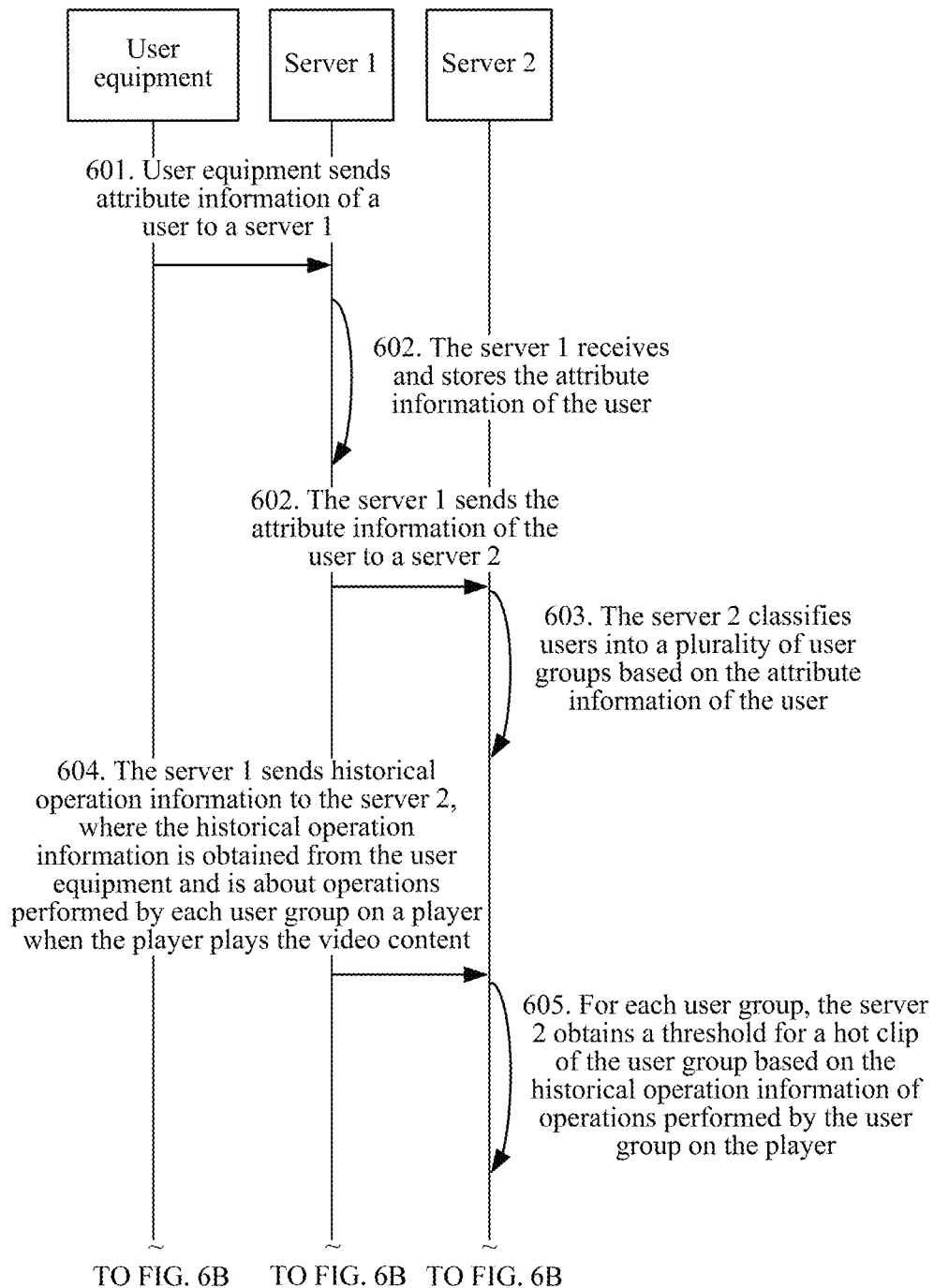
FIG. 6A and FIG. 6B are a schematic flowchart of a hot video clip extraction method according to an embodiment.
Figure 6B:
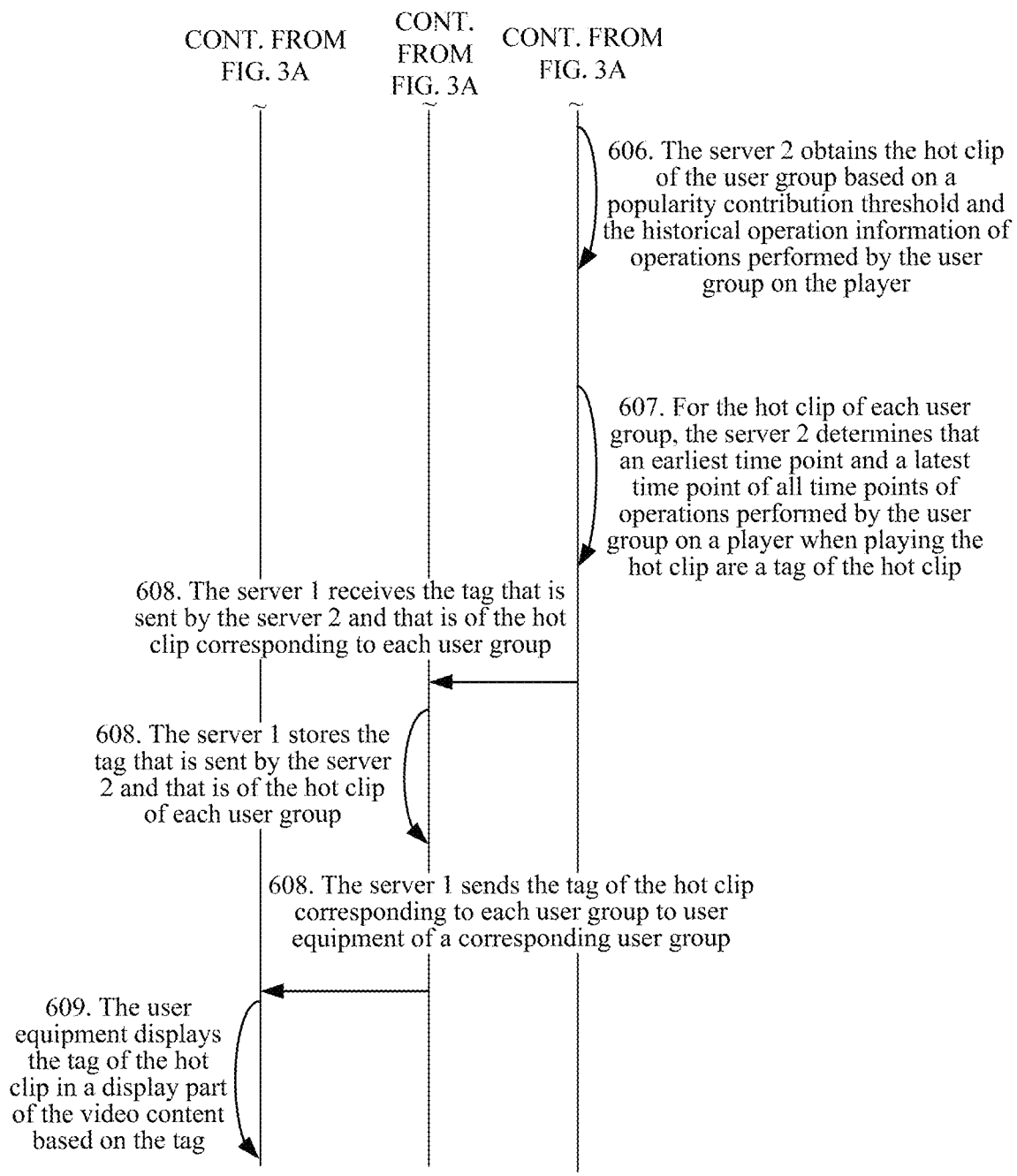

The following further describes an example in which the information about operations performed by each user group on the video content is historical operation information of operations performed by the users on a player. An embodiment provides a hot video clip extraction method. As shown in FIG. 6A and FIG. 6B, the method may include the following steps.

In step 601, user equipment sends attribute information of a user to a server 1.

In step 602, the server 1 receives and stores the attribute information of the user, and may send the attribute information of the user to a server 2.

In step 603, the server 2 classifies users into a number of user groups based on the attribute information of the user.

For implementations of steps 601 to 603, refer to steps 301 to 303.

In step 604, the server 1 sends historical operation information to the server 2, where the historical operation information is obtained from the user equipment and is about operations performed by each user group on a player when the player plays the video content.

Information about operations performed by a user on the player may be: fast forward, forward drag, rewind, backward drag, among other operations. If the user performs a fast forward or forward drag operation on a video clip of the video content, it indicates that the user is not interested in the video clip, and the server 1 may record an operation name, and a start time point and an end time point of the fast forward operation or forward drag operation, and duration of the video clip, and obtain duration of the fast forward operation or the forward drag operation. For example, if the user has fast-forwarded the video clip for 10 seconds or has dragged the video clip forward for 10 seconds, the server 1 may record the duration as −10 s, indicating that the fast forward operation or the forward drag operation has made a negative contribution to the popularity contribution value of the video clip. If the user performs a rewind or backward drag operation on a video clip of the video content, it indicates that the user is interested in the video clip and intends to watch the video clip repeatedly, and the server 1 may record an operation name, and a start time point and an end time point of the rewind operation or backward drag operation, and duration of the video clip, and obtain duration of the rewind operation or the backward drag operation. For example, if the user has rewound the video clip for 10 seconds or has dragged the video clip backward for 10 seconds, the server 1 may record the duration as +10 s, indicating that the rewind operation or the backward drag operation has made a positive contribution to the popularity contribution value of the video clip.

This embodiment is still described by using an example in which the player plays the Spring Festival Gala. For each user group watching the video content of the Spring Festival Gala, the server obtains duration of each operation type based on a start time and an end time of each type of operation performed by each user in the user group when playing the video content. For example, Table 10 shows historical operation information of operations performed by users on the player in watching each video clip of the Spring Festival Gala, where the historical operation information is recorded by the server 1 in a preset time period.

TABLE 10

Historical operation information of operations performed by users on the player in watching Spring Festival Gala

|  | Video ID | User ID | Start time point (s) of operation | Name of operation | End time point (s) of operation | Operation duration (s) (duration of corresponding video clip) |
|---|---|---|---|---|---|---|
| TFboys | XX | 001 | 10.11 | Fast forward | 12.11 | −2 (250) |
|  | XX | 001 | 50.23 | Rewind | 30.23 | 20 (250) |
|  | XX | 002 | 105.45 | Backward drag | 55.45 | 50 (250) |
|  | XX | 004 | 200.22 | Forward drag | 230.22 | −30 (250) |
|  | XX | 005 | 250.31 | Fast forward | 258.31 | −8 (250) |
| Jay Chou | XX | 006 | 305.46 | Fast forward | 315.46 | −10 (300) |
|  | XX | 007 | 350.54 | Backward drag | 310.54 | 40 (300) |
|  | XX | 008 | 410.34 | Rewind | 400.34 | 10 (300) |
|  | XX | 007 | 425.42 | Backward drag | 390.42 | 35 (300) |
|  | XX | 010 | 460.26 | Rewind | 430.26 | 30 (300) |
|  | XX | 011 | 507.49 | Fast forward | 513.49 | −6 (300) |
|  | XX | 012 | 560.51 | Forward drag | 600.51 | −40 (300) |
| Song Zuying | XX | 013 | 609.37 | Forward drag | 629.37 | −20 (280) |
|  | XX | 014 | 620.32 | Forward drag | 650.32 | −30 (280) |
|  | XX | 015 | 780.53 | Backward drag | 740.53 | 40 (280) |
|  | XX | 016 | 850.25 | Rewind | 820.25 | 30 (280) |

In step 605, for each user group, the server 2 obtains a threshold for a hot clip of the user group based on the historical operation information of operations performed by the user group on the player.

The server 2 may group, based on different user groups, the historical operation information of operations performed on the player. Regardless of which video clip is operated by a user on the player, the user is may be classified into a user group to which the user belongs. For example, referring to the exemplary values in Table 10, a user having an ID 001 starts a fast forward operation on a TFboys video clip in a Spring Festival Gala video at 10.11 s and ends the operation at 12.11 s, and therefore the operation information is classified into the user group 1. For example, the grouping of each user group is shown in Table 4, the historical operation information of operations performed by the users on the player in watching the Spring Festival Gala is shown in Table 10. Therefore, the grouped historical operation information of operations performed on the player is shown in Table 11.

TABLE 11

Grouping of historical operation information of operations performed on the player

|   | Video clip | User ID | Start time point (s) of operation | Name of operation | End time point (s) of operation | Operation duration (s) (duration of corresponding video clip) |
|---|---|---|---|---|---|---|
| user Group1 | TFboys | 001 | 10.11 | Fast forward | 12.11 | −2 (250) |
|  |  | 001 | 50.23 | Rewind | 30.23 | 20 (250) |
|  |  | 002 | 105.45 | Backward drag | 55.45 | 50 (250) |
|  | Jay Chou | 006 | 305.46 | Fast forward | 315.46 | −10 (300) |
|  | Song Zuying | 013 | 609.37 | Forward drag | 629.37 | −20 (280) |
| user group2 | TFboys | 004 | 200.22 | Forward drag | 230.22 | −30 (250) |
|  | Jay Chou | 007 | 350.54 | Backward drag | 310.54 | 40 (300) |
|  |  | 008 | 410.34 | Rewind | 400.34 | 10 (300) |
|  |  | 007 | 425.42 | Backward drag | 390.42 | 35 (300) |
|  |  | 010 | 460.26 | Rewind | 430.26 | 30 (300) |
|  |  | 011 | 507.49 | Fast forward | 513.49 | −6 (300) |
|  | Song Zuying | 014 | 620.32 | Forward drag | 650.32 | −30 (280) |
| user group3 | TFboys | 005 | 250.31 | Fast forward | 258.31 | −8 (250) |
|  | Jay Chou | 012 | 560.51 | Forward drag | 600.51 | −40 (300) |
|  | Song Zuying | 015 | 780.53 | Backward drag | 740.53 | 40 (280) |
|  |  | 016 | 850.25 | Rewind | 820.25 | 30 (280) |

Subsequently, a popularity contribution threshold for the hot clip of the user group is obtained based on the information about operations performed by each user in each user group on the player. Because different information about operations performed by the user on the player in playing the video clip can reflect preference of the user for content of the video clip, the different information about operations performed by the user on the player in playing the video clip may be used to measure a popularity value of the video clip. In this embodiment, popularity contribution of each operation type of each user may be calculated by using a formula to calculate a popularity contribution value. For each user in each user group, the popularity contribution value of each operation type may be a ratio of a product of duration of the operation type and a weighted value of the operation type, to duration of a video clip corresponding to the operation type.

For example, for a fast forward operation, the formula of the popularity contribution value may be: $Hot_A(t_A,T_v)=K_A*t_A/T_v$, where $Hot_A$ is the popularity contribution value of the fast forward operation, $t_A$ is the fast forward duration, that is, duration of the fast forward operation type, $T_v$ is duration of the corresponding video clip, and $K_A$ is a weighted value of the fast forward operation type and may fall within (0~1). For a forward drag operation, the formula of the popularity contribution value may be: $Hot_B(t_B,T_v)=K_B*t_B/T_v$, where $Hot_B$ is the popularity contribution value of the forward drag operation, $t_B$ is the forward drag duration, or the duration of the forward drag operation type, $T_v$ is duration of the corresponding video clip, and $K_B$ is a weighted value of the forward drag operation type. Considering that the forward drag indicates the user's stronger dislike for the video content than the fast forward, $K_B \geq K_A$, where $K_B$ may fall within (0~1). For a rewind operation, the formula of the popularity contribution value may be: $Hot_C(t_C,T_v)=K_C*t_C/T_v$, where $Hot_C$ is the popularity contribution value of the rewind operation, $t_C$ is the rewind duration, or the duration of the rewind operation type, $T_v$ is duration of the corresponding video clip, and $K_C$ is a weighted value of the rewind operation type and falls within (0~1). For a backward drag operation, the formula of the popularity contribution value may be: $Hot_D(t_D,T_v)=K_D*t_D/T_v$, where $Hot_D$ is the popularity contribution value of the backward drag operation, $t_D$ is the backward drag duration, or duration of the backward drag operation type, $T_v$ is duration of the corresponding video clip, and $K_D$ is a weighted value of the backward drag operation type. Considering that the backward drag indicates the user's stronger preference for the video content than the rewind operation, $K_D \geq K_C$, where $K_D$ may fall within (0~1).

Based on the foregoing calculation method of the popularity contribution values of the operation types, a total popularity contribution value of each user group may be obtained. The total popularity contribution value of each user group may be expressed as $$\sum_{i \in U} Hot_i,$$

a sum of popularity contribution values of operations performed by the user group on the player, where U denotes a set of operations performed by any user group on the player, and $Hot_i$ is one of $Hot_A$, $Hot_B$, $Hot_C$, or $Hot_D$. Subsequently, a product of a ratio of the total popularity contribution value of the user group to a quantity of video clips of the video content, and a preset coefficient may indicate the popularity contribution threshold for the hot clip of the video content watched by the user group. The popularity contribution threshold for the hot clip of the user group may equal (Total popularity contribution value of the user group/Quantity of video clips)*C, where C is a preset coefficient.

If values of C, $K_A$, $K_B$, $t_C$, and $K_D$ in the foregoing formulas are all 1, in light of conditions in Table 11, the threshold for the hot clip of the user Group 1

$= (\text{Hot}_A(-2, 250) + \text{Hot}_C(20, 250) + \text{Hot}_D(50, 250) + \text{Hot}_A(-10, 300) + \text{Hot}_B(-20, 280))/3 = (-2*K_A/250 + 20*K_C/250 + 50*K_D/250 - 10*K_A/300 - 20*K_B/280)/3 = 0.056,$ the threshold for the hot clip of the user Group 2

$= (\text{Hot}_B(-30, 250) + \text{Hot}_D(40, 300) + \text{Hot}_C(10, 300) + \text{Hot}_D(35, 300) + \text{Hot}_C(30, 300) + \text{Hot}_A(-6, 300) + \text{Hot}_B(-30, 280))/3$ $= (-30*K_B/250 + 40*K_D/300 + 10*K_C/300 + 35*K_D/300 + 30*K_C/300 - 6*K_A/300 - 30*K_B/280)/3 = 0.045;$ and the threshold for the hot clip of the user Group 3

$= (\text{Hot}_A(-8, 250) + \text{Hot}_B(-40, 300) + \text{Hot}_D(40, 280) + \text{Hot}_C(30, 280))/3$ $= (-8*K_A/250 - 40*K_B/300 + 40*K_D/280 + 30*K_C/280)/3 = 0.085.$ Therefore, the popularity contribution threshold for the hot clip of each user group may be shown in Table 12.

TABLE 12

Popularity contribution threshold for the hot clip of each user group

| | Video clip | User ID | Start time point (s) of operation | Name of operation | End time point (s) of operation | Operation duration (s) (duration of corresponding video clip) | Popularity contribution threshold for the hot clip of each user group |
|---|---|---|---|---|---|---|---|
| user Group1 | TFboys | 001 | 10.11 | Fast forward | 12.11 | −2 (250) | 0.056 |
| | | 001 | 50.23 | Rewind | 30.23 | 20 (250) | |
| | | 002 | 105.45 | Backward drag | 55.45 | 50 (250) | |
| | Jay Chou | 006 | 305.46 | Fast forward | 315.46 | −10 (300) | |
| | Song Zuying | 013 | 609.37 | Forward drag | 629.37 | −20 (280) | |
| user group2 | TFboys | 004 | 200.22 | Forward drag | 230.22 | −30 (250) | 0.045 |
| | Jay Chou | 007 | 350.54 | Backward drag | 310.54 | 40 (300) | |
| | | 008 | 410.34 | Rewind | 400.34 | 10 (300) | |
| | | 007 | 425.42 | Backward drag | 390.42 | 35 (300) | |
| | | 010 | 460.26 | Rewind | 430.26 | 30 (300) | |
| | | 011 | 507.49 | Fast forward | 513.49 | −6 (300) | |
| | Song Zuying | 014 | 620.32 | Forward drag | 650.32 | −30 (280) | |
| user group3 | TFboys | 005 | 250.31 | Fast forward | 258.31 | −8 (250) | 0.085 |
| | Jay Chou | 012 | 560.51 | Forward drag | 600.51 | −40 (300) | |
| | Song Zuying | 015 | 780.53 | Backward drag | 740.53 | 40 (280) | |
| | | 016 | 850.25 | Rewind | 820.25 | 30 (280) | |

In step 606, the server 2 obtains the hot clip of the user group based on a popularity contribution threshold and the historical operation information of operations performed by the user group on the player.

If the popularity contribution value of a user group for a video clip is greater than the popularity contribution threshold for the hot clip of the user group, it may be determined that the video clip is the hot clip of the user group. That is, for each user group, the server obtains a sum of popularity contribution values of the user group for each video clip of the video content, and determines that a video clip whose sum of popularity contribution values is greater than the popularity contribution threshold is the hot clip of the user group.

For example, according to the conditions in Table 12, if all weighted values are 1, the total popularity contribution value of the user Group 1 for the video clip performed by TFboys $= \text{Hot}_A(-2, 250) + \text{Hot}_C(20, 250) + \text{Hot}_D(50, 250)$ -continued $= -2*K_A/250 + 20*K_C/250 + 50*K_D/250 = 0.272;$ the total popularity contribution value of the user Group 1 for the video clip performed by Jay Chou $= \text{Hot}_A(-10,300) = -10*K_A/300 = -0.033;$ the total popularity contribution value of the user Group 1 for the video clip performed by Song Zuying $= \text{Hot}_B(-20,280) = -20*K_B/280 = -0.071;$ the total popularity contribution value of the user Group 2 for the video clip performed by TFboys $= \text{Hot}_B(-30,250) = -30*K_B/250 = -0.12;$ the total popularity contribution value of the user Group 2 for the video clip performed by Jay Chou $= \text{Hot}_D(40, 300) + \text{Hot}_C(10, 300) + (\text{Hot})_D(35, 300) + \text{Hot}_C(30, 300) + \text{Hot}_A(-6, 300)$ $= 40 * K_D/300 + 10 * K_C/300 + 35 * K_D/300 + 30 * K_C/300 - 6 * K_A/300 = 0.363;$ the total popularity contribution value of the user Group 2 for the video clip performed by Song Zuying $=\text{Hot}_B(-30,280)=-30*K_B/280=-0.107;$ the total popularity contribution value of the user Group 3 for the video clip performed by TFboys $=\text{Hot}_A(-8,250)=-8*K_A/250=-0.032;$ the total popularity contribution value of the user Group 3 for the video clip performed by Jay Chou $=\text{Hot}_B(-40,300)=-40*K_B/300=-0.133;$ and the total popularity contribution value of the user Group 3 for the video clip performed by Song Zuying $=\text{Hot}_D(40,280)+\text{Hot}_C(30,280)=40*K_D/280+30*K_C/280=0.25.$ The total popularity contribution value of the user group 1 for the clip of the TFboys show is 0.272 and the popularity contribution threshold of the user group 1 for the hot clip is 0.056, and the popularity contribution value 0.272 is greater than the popularity contribution threshold 0.056. Therefore, the clip of the TFboys show is a hot clip belonging to the user Group 1. In this way, the corresponding hot clip of each user group may be shown in Table 13.

operation of the user 001 is 10.11 s, which is the earliest time point; the start time point of the operation of the user 002 is 105.45 s, which is the latest time point. Therefore, the tag of the hot clip of the user Group 1 is (10.11 s, 105.45 s). For the hot clip of the user Group 2, the end time point of the operation of the user 007 is 310.54 s, which is the earliest time point; the end time point of the operation of the user 011 is 513.49 s, which is the latest time point. Therefore, the tag of the hot clip of the user Group 2 is (310.54 s, 513.49 s). For the hot clip of the user Group 3, the end time point of the operation of the user 015 is 740.53 s, which is the earliest time point; the start time point of the operation of the user 016 is 850.25 s, which is the latest time point. Therefore, the tag of the hot clip of the user Group 3 is (740.53 s, 850.25 s).

In step 608, the server 1 receives a tag that is sent by the server 2 referring to the hot clip corresponding to each user group, stores the tag, and sends the tag of the hot clip corresponding to each user group to user equipment of a corresponding user group.

After the server 1 obtains the tag of the hot clip of the video content watched by each user group, if a user whose registration information is stored in the server 1 watches the video content, the server 1 may send the tag of the hot clip

TABLE 13

Hot clip of each user group

| | Video clip | User ID | Start time point (s) of operation | Name of operation | End time point (s) of operation | Operation duration (s) (duration of corresponding video clip) | Popularity contribution value for corresponding video clip | Popularity contribution threshold of each user group | Hot clip belonging to each user group |
|---|---|---|---|---|---|---|---|---|---|
| user Group1 | TFboys | 001 | 10.11 | Fast forward | 12.11 | -2 (250) | 0.272 | 0.056 | Hot clip |
| | | 001 | 50.23 | Rewind | 30.23 | 20 (250) | | | |
| | | 002 | 105.45 | Backward drag | 55.45 | 50 (250) | | | |
| | Jay Chou | 006 | 305.46 | Fast forward | 315.46 | -10 (300) | -0.033 | | |
| | Song Zuying | 013 | 609.37 | Forward drag | 629.37 | -20 (280) | -0.071 | | |
| user group2 | TFboys | 004 | 200.22 | Forward drag | 230.22 | -30 (250) | -0.12 | 0.045 | |
| | Jay Chou | 007 | 350.54 | Backward drag | 310.54 | 40 (300) | 0.363 | | Hot clip |
| | | 008 | 410.34 | Rewind | 400.34 | 10 (300) | | | |
| | | 007 | 425.42 | Backward drag | 390.42 | 35 (300) | | | |
| | | 010 | 460.26 | Rewind | 430.26 | 30 (300) | | | |
| | | 011 | 507.49 | Fast forward | 513.49 | -6 (300) | | | |
| | Song Zuying | 014 | 620.32 | Forward drag | 650.32 | -30 (280) | -0.107 | | |
| user group3 | TFboys | 005 | 250.31 | Fast forward | 258.31 | -8 (250) | -0.032 | 0.085 | |
| | Jay Chou | 012 | 560.51 | Forward drag | 600.51 | -40 (300) | -0.133 | | |
| | Song Zuying | 015 | 780.53 | Backward drag | 740.53 | 40 (280) | 0.25 | | Hot clip |
| | | 016 | 850.25 | Rewind | 820.25 | 30 (280) | | | |

In step 607, for the hot clip of each user group, the server 2 determines that an earliest time point and a latest time point of all time points of operations performed by the user group on a player when playing the hot clip are a tag of the hot clip.

For the hot clip of each user group, the earliest time point in the tag is a time point of a chronologically first operation of operations performed by the user group on the hot clip, and the latest time point is a time point of a chronologically last operation of the operations performed by the user group on the hot clip.

Referring to the conditions in Table 13, for example, for the hot clip of the user group 1, the start time point of the of the video content to the user equipment of the corresponding user group watching the video content.

In step 609, the user equipment displays the tag of the hot clip in a display part of the video content based on the tag.

Figure 7:
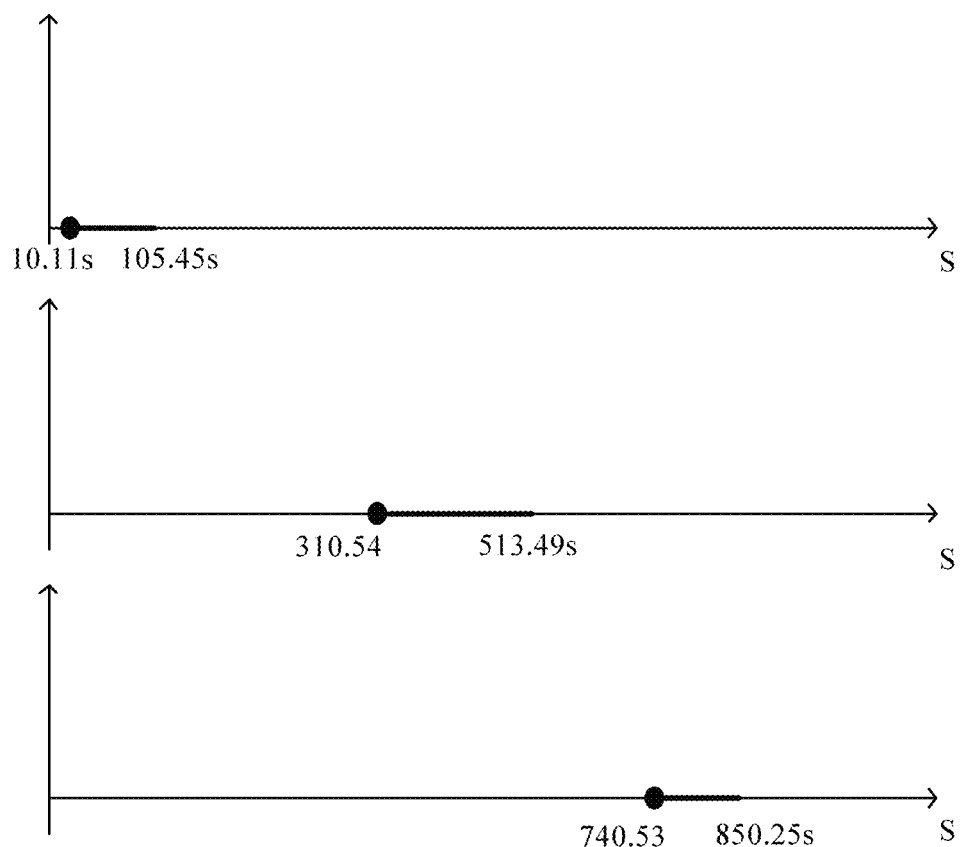
FIG. 7 is a schematic diagram of presenting a different hot clip to each user group according to an embodiment.

In a possible implementation, for each user group, the user equipment may mark a dot at the earliest time point of the hot clip of a play time axis based on the earliest time point and the latest time point of time points of operations performed by the user group on the player, and mark a color distinguishable from that of a non-hot clip in a hot clip section delimited by the earliest time point and the latest time point. For example, as shown in FIG. 7, FIG. 7 shows hot clips that are marked and presented according to Table 13 and that are of the Spring Festival Gala video watched by each user group.

Figure 8:
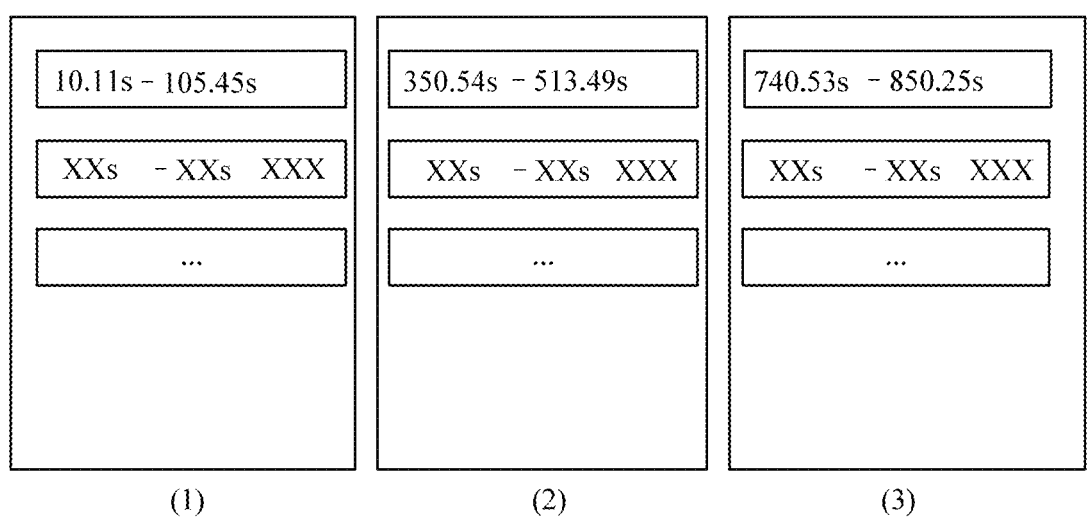
FIG. 8 is a schematic diagram of presenting a different hot clip to each user group according to an embodiment.

In another possible implementation, for each user group, the user equipment may present the hot clip to the user group in a video display area, in a list form, and based on the earliest time point and the latest time point of time points of operations performed by the user group on the player. More than one hot clip may be presented to the same user group. Referring to the exemplary embodiment in FIG. 8, FIG. 8 may show 3 lists of hot clips according to the example in Table 13, including a list of hot clips presented to the user Group 1, a list of hot clips presented to the user Group 2, and a list of hot clips presented to the user Group 3.

In this way, this embodiment can extract and present a personalized hot clip for each user group, and improve accuracy of accessing the hot clip by the user; compared with the prior art in which a same hot clip is presented to all users, this embodiment can extract and present obscured hot clips that belong to some user groups.

The foregoing mainly describes the solutions in the embodiments herein from the perspective of interaction between network elements. To implement the foregoing functions, each network element such as a server or user equipment includes corresponding hardware structures and/or software modules that perform functions. A person of ordinary skill in the art may understand that, in combination with the examples described in the embodiments, units, algorithms, or steps may be implemented by hardware or a combination of hardware and computer software. Whether a function is performed by hardware or hardware driven by computer software depends on particular applications and design constraints of the technical solutions. A person of ordinary skill in the art may use different methods to implement the described functions for each particular embodiment, but it should not be considered that the implementation goes beyond the scope of embodiments herein.

In the embodiments, function modules of the server, the user equipment, or the like may be divided based on the foregoing method examples. For example, function modules may be divided corresponding to functions, or two or more functions may be integrated into one processing module. The integrated module may be implemented in a form of hardware, or may be implemented in a form of a software functional module. It should be noted that, in this embodiment, module division is exemplary, and is merely a logical function division. In actual implementation, another division manner may be used.

Figure 9:
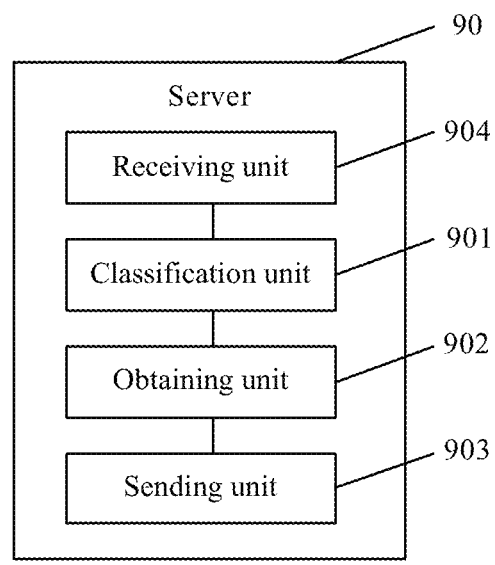
FIG. 9 is a schematic structural diagram of a server according to an embodiment.

Referring now to the exemplary embodiment in FIG. 9, FIG. 9 may illustrate a possible schematic structural diagram of a server. Function modules are divided corresponding to functions, and functions of the server 1 and the server 2 are integrated into one server. The server 90 may include: a classification unit 901, an obtaining unit 902, a sending unit 903, and a receiving unit 904. The classification unit 901 is configured to support the server in performing step 303 in FIG. 3A and FIG. 3B and step 603 in FIG. 6A and FIG. 6B. The obtaining unit 303 is configured to support the server in performing steps 304, 305, and 306 in FIG. 3A and FIG. 3B and steps 605, 606, and 607 in FIG. 6A and FIG. 6B. The sending unit 903 is configured to perform steps 307 and 309 in FIG. 3A and FIG. 3B and step 604 in FIG. 6A and FIG. 6B. The receiving unit 904 is configured to support the server in performing step 302 in FIG. 3A and FIG. 3B and steps 602 and 608 in FIG. 6A and FIG. 6B. For all related content of the steps in the foregoing method embodiments, refer to function descriptions of corresponding functional modules, and details are not described herein again.

When the units are integrated, a possible schematic structural diagram of the server 1 and the server 2 in the foregoing embodiments may be shown in FIG. 2. For example, a data sending module 12 and a historical data obtaining module 21 may be configured to support the server 1 in performing step 302 in FIG. 3A and FIG. 3B and steps 602 and 604 in FIG. 6A and FIG. 6B; a user classification module 22 may be configured to support the server 2 in performing step 303 in FIG. 3A and FIG. 3B and step 603 in FIG. 6A and FIG. 6B. A hot clip obtaining module 23 may perform steps 304 to 306 in FIG. 3A and FIG. 3B and steps 605 and 606 in FIG. 6A and FIG. 6B. A tag extraction module 24 may perform step 307 in FIG. 3A and FIG. 3B and step 607 in FIG. 6A and FIG. 6B. A data sending module 25 may perform step 308 in FIG. 3A and FIG. 3B and step 608 in FIG. 6A and FIG. 6B. A data sending module 12 may perform step 309 in FIG. 3A and FIG. 3B and step 608 in FIG. 6A and FIG. 6B. The server 1 and the server 2 may further include a storage module (not shown in FIG. 2), and the storage module is configured to store program code and data of the server 1 and the server 2.

The user classification module 22, the hot clip extraction module 23, and the tag extraction module 24 may be a processor or controller, such as a central processing unit (CPU), a general-purpose processor, a digital signal processor (DSP), an application-specific integrated circuit (ASIC), a field programmable gate array (FPGA), or another programmable logical device, a transistor logical device, a hardware component, or any combination thereof. The controller/processor may implement or execute various example logical blocks, modules, and circuits described with reference to content disclosed herein. Alternatively, the processor may be a combination of processors implementing a computing function, for example, a combination of one or more microprocessors, or a combination of the DSP and a microprocessor. The historical data obtaining module 21, the data sending optical module 25, the data sending module 12, and the data receiving module 11 may be a transceiver, a transceiver circuit, a communications interface, or similar device as is known to a person of ordinary skill in the art. The data storage module 11 may be a memory unit.

Figure 10:
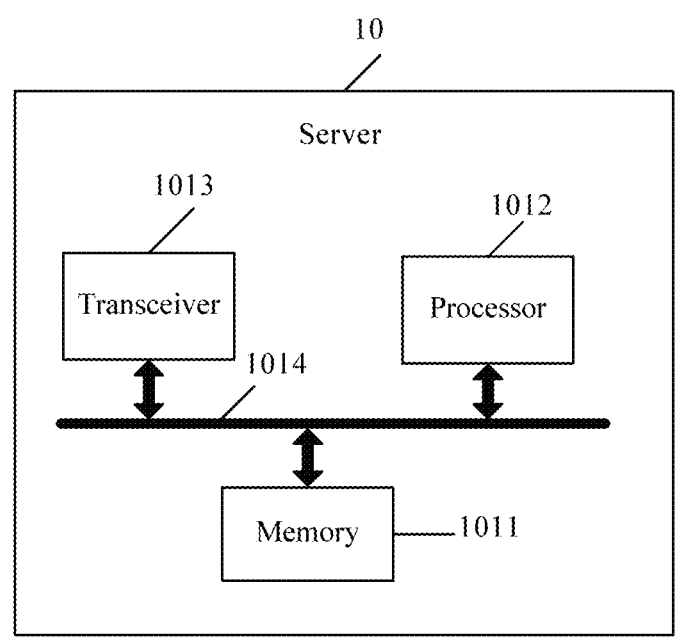
FIG. 10 is a schematic structural diagram of a server according to an embodiment.

When the user classification module 22, the hot clip extraction module 23, and the tag extraction module 24 are processors, the historical data obtaining module 21, the data sending optical module 25, the data sending module 12, and the data receiving module 11 may be transceivers, and the data storage module 11 may be a memory, if functions of the server 1 and the server 2 are integrated into one server, the server in the embodiments may be the server shown in FIG. 10.

Referring to FIG. 10, the server 10 includes a processor 1012, a transceiver 1013, a memory unit 1011, and a bus 1014. The transceiver 1013, the processor 1012, and the memory unit 1011 are connected to each other via the bus 1014, such as a peripheral component interconnect (PCI) bus, or an Extended Industry Standard Architecture (EISA). The bus 1014 may be classified into an address bus, a data bus, a control bus, and the like. For ease of representation, only one thick line is used to represent the bus in FIG. 10, but this does not mean that there is only one bus or only one type of bus.

Figure 11:
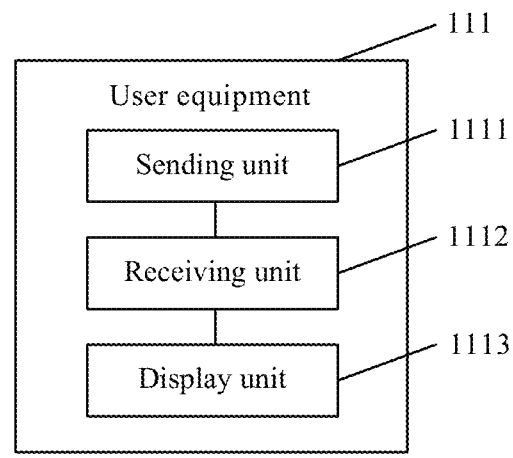
FIG. 11 is a schematic structural diagram of user equipment according to an embodiment.

Referring now to the exemplary embodiment in FIG. 11, FIG. 11 is a possible schematic structural diagram of user equipment in the foregoing embodiment. The user equipment 111 includes: a sending unit 1111, a receiving unit 1112, and a display unit 1113. The sending unit 1111 is configured to support the user equipment in performing step 301 in FIG. 3A and FIG. 3B and step 601 in FIG. 6A and FIG. 6B. The receiving unit 1112 is configured to support the user equipment in performing step 309 in FIG. 3A and FIG. 3B and step 608 in FIG. 6A and FIG. 6B. The display unit 1113 is configured to support the user equipment in performing step 310 in FIG. 3A and FIG. 3B and step 609 in FIG. 6A and FIG. 6B. For all related content of the steps in the foregoing method embodiments, refer to function descriptions of corresponding functional modules, and details are not described herein again.

Referring now to the exemplary embodiment in FIG. 2, FIG. 2 is a possible schematic structural diagram of the user equipment in the foregoing embodiments. The user equipment 0 includes a data collection/sending module 01 and a presenting module 02. For example, the data collection/sending module 01 is configured to support the user equipment in performing step 301 in FIG. 3A and FIG. 3B and step 601 in FIG. 6A and FIG. 6B, and the presenting module 02 is configured to perform step 310 in FIG. 3A and FIG. 3B and step 609 in FIG. 6A and FIG. 6B. The data collection/sending module 01 is configured to support communication between the user equipment and another network entity, such as communication between the user equipment and a function module or network entity shown in FIG. 2, FIG. 3A and FIG. 3B, or FIG. 6A and FIG. 6B. The user equipment 0 may further include a storage module 03 and a processing module 04 (not shown). The storage module 03 is configured to store program code and data of the user equipment, and the processing module 04 is configured to control and manage actions of the user equipment.

The processing module 04 may be a processor or controller such as a CPU, a general-purpose processor, a DSP, an ASIC, a FPGA, or another programmable logical device, a transistor logical device, a hardware component, or any combination thereof. The controller/processor may implement or execute various example logical blocks, modules, and circuits described with reference to content disclosed herein. Alternatively, the processor may be a combination of processors implementing a computing function, for example, a combination of one or more microprocessors, or a combination of the DSP and a microprocessor. The data collection/sending module 01 may be a transceiver, a transceiver circuit, a communications interface, or the like. The storage module 03 may be a memory, and the presenting module 02 may be a display, a display screen, or the like.

Figure 12:
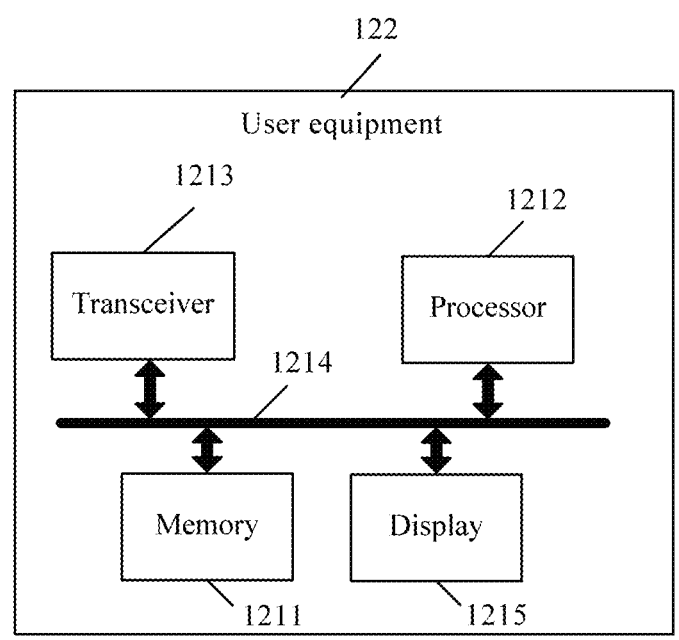
FIG. 12 is a schematic structural diagram of user equipment according to an embodiment.

Referring now to the exemplary embodiment in FIG. 12, FIG. 12 may illustrate a user equipment where the processing module 04 is a processor, the data collection/sending module 01 is a transceiver, the storage module 03 is a memory, and the presenting module is a display.

Referring to FIG. 12, the user equipment 122 includes a processor 1212, a transceiver 1213, a memory 1211, a display 1215, and a bus 1214. The transceiver 1213, the processor 1212, the display 1215, and the memory 1211 are connected to each other through the bus 1214. The bus 1214 may be a PCI bus, an EISA bus, or any other contemplated bus, such as is known to a person of ordinary skill in the art. The bus 1214 may be classified into an address bus, a data bus, a control bus, and the like. For ease of representation, only one thick line is used to represent the bus in FIG. 12, but this does not mean that there is only one bus or only one type of bus.

Method or algorithm steps described in combination with the content disclosed herein may be implemented by hardware, or may be implemented by a processor by executing a software instruction. The software instruction may include a corresponding software module. The software module may be stored in a random access memory (RAM), a flash memory, a read-only memory (ROM), an erasable programmable read only memory (Erasable Programmable ROM, EPROM), an electrically erasable programmable read only memory (Electrically EPROM, EEPROM), a register, a hard disk, a mobile hard disk, a compact disc read-only memory (CD-ROM), or any other form of storage medium well-known in the art. For example, a storage medium is coupled to a processor, so that the processor can read information from the storage medium or write information into the storage medium. The storage medium may be a component of the processor. The processor and the storage medium may be located in the ASIC. In addition, the ASIC may be located in a core network interface device. The processor and the storage medium may exist in the core network interface device as discrete components.

A person skilled in the art should be aware that in the foregoing one or more examples, functions described herein may be implemented by hardware, software, firmware, or any combination thereof. When an embodiment is implemented by software, the foregoing functions may be stored in a computer-readable medium or transmitted as one or more instructions or code in the computer-readable medium. The computer-readable medium includes a computer storage medium and a communications medium, where the communications medium includes any medium that enables a computer program to be transmitted from one place to another. The storage medium may be any available medium accessible to a general-purpose or dedicated computer.

The objectives, technical solutions, and benefits of embodiments are further described in detail in the foregoing exemplary embodiments. It should be understood that the foregoing descriptions are merely exemplary embodiments, but are not intended to limit the protection scope. Any modification, equivalent replacement, or improvement made within the spirit and principle of the present invention shall fall within the protection scope of the exemplary embodiments described herein.

What is claimed is:

1. A system for video extraction comprising a server, a first terminal and a second terminal;
wherein the server is configured to:
send video content to the first terminal and the second terminal, respectively, wherein the video content comprises a first hot clip and a second hot clip;
send a first tag of the first hot clip to the first terminal; and
send a second tag of the second hot clip to the second terminal;
wherein the first terminal is configured to:
display the first tag on a play time axis of the video content, wherein the first tag is located in a first location of the play time axis;
and wherein the second terminal is configured to:
display the second tag on the play time axis of the video content, wherein the second tag is located in a second location of the play time axis,
wherein the server receives attribute information of the users sent by the first terminal and the second terminal, and the server classifies users into a plurality of user groups based on the attribute information of the users,
wherein, to classify the users into the plurality of user groups, the server analyzes the attribute information based on a clustering algorithm by using an attribute vector of each user and a Euclidean distance between the attribute vector of the user and a centroid, wherein a user of the first terminal corresponds to a first user group, and a user of the second terminal corresponds to a second user group; and wherein the server is further configured to obtain the first hot clip and the second hot clip based on information about operations performed by each of the plurality of user groups in watching the video content, wherein the operations performed by each of the plurality of user groups comprise fast forward, rewind, forward drag, and backward drag, wherein if at least one user of the plurality of user groups performs the fast forward operation or the forward drag operation on a video clip of the video content, a negative contribution is made to a popularity contribution value of the video clip, wherein if the at least one user of the plurality of user groups performs the rewind operation or the backward drag operation on the video clip of the video content, a positive contribution is made to the popularity contribution value of the video clip.

2. The system of claim 1, wherein the operations performed by each of the plurality of user groups comprise a bullet screen comment.

3. The system of claim 1, wherein the first tag is used to indicate a start time of the first hot clip.

4. The system of claim 1, wherein the second tag is used to indicate a start time of the second hot clip.

5. The system of claim 1, wherein each of clusters corresponds to each of the user groups, and the server allocates at least one of the users into at least one of the clusters with the centroid located at a shortest Euclidean distance.

6. The system of claim 1, wherein the server obtains the first hot clip and the second hot clip based on the information about the operations performed by each of the plurality of user by using predetermined factors including a bullet screen comment threshold and a popularity contribution threshold, wherein the server further obtains, for each of the plurality of user groups, a ratio of a quantity of historical bullet screen comments of at least one of the plurality of user groups on the video content to a quantity of video clips of the video content, and obtains a product of the ratio wherein the product of the ratio is the bullet screen comment threshold for the first or second hot clip of the at least one of the plurality of user groups.

7. A method of video clip extraction, comprising:

sending, by a server, video content to a first terminal and a second terminal, respectively, wherein the video content comprises a first hot clip and a second hot clip;

sending, by the server, a first tag of the first hot clip to the first terminal;

sending, by the server, a second tag of the second hot clip to the second terminal;

displaying, by the first terminal, the first tag on a play time axis of the video content, wherein the first tag is located in a first location of the play time axis;

displaying, by the second terminal, the second tag on the play time axis of the video content, wherein the second tag is located in a second location of the play time axis;

receiving, by the server, the attribute information of the users sent by the first terminal and the second terminal; and classifying, by the server, users into a plurality of user groups based on attribute information of the users, wherein a user of the first terminal corresponds to a first user group, and a user of the second terminal corresponds to a second user group, wherein, to classify the users into the plurality of user groups, the server analyzes the attribute information based on a clustering algorithm by using an attribute vector of each user and a Euclidean distance between the attribute vector of the user and a centroid, wherein the method further comprises obtaining, by the server, the first hot clip and the second hot clip based on information about operations performed by each of the plurality of user groups in watching the video content, wherein the operations performed by each of the plurality of user groups comprise fast forward, rewind, forward drag, and backward drag, wherein if at least one user of the plurality of user groups performs the fast forward operation or the forward drag operation on a video clip of the video content, a negative contribution is made to a popularity contribution value of the video clip, wherein if the at least one user of the plurality of user groups performs the rewind operation or the backward drag operation on the video clip of the video content, a positive contribution is made to the popularity contribution value of the video clip.

8. The method of claim 7, wherein the operations performed by each of the plurality of user groups comprise a bullet screen comment.

9. The method of claim 7, wherein the first tag is used to indicate a start time of the first hot clip.

10. The method of claim 7, wherein the second tag is used to indicate a start time of the second hot clip.

11. A non-transitory computer readable medium storing instructions executed by a computer to perform:

sending, by a server, video content to a first terminal and a second terminal, respectively, wherein the video content comprises a first hot clip and a second hot clip;

sending, by the server, a first tag of the first hot clip to the first terminal;

sending, by the server, a second tag of the second hot clip to the second terminal;

displaying, by the first terminal, the first tag on a play time axis of the video content, wherein the first tag is located in a first location of the play time axis;

displaying, by the second terminal, the second tag on the play time axis of the video content, wherein the second tag is located in a second location of the play time axis;

receiving, by the server, the attribute information of the users sent by the first terminal and the second terminal; and classifying, by the server, users into a plurality of user groups based on attribute information of the users, wherein a user of the first terminal corresponds to a first user group, and a user of the second terminal corresponds to a second user group, wherein, to classify the users into the plurality of user groups, the server analyzes the attribute information based on a clustering algorithm by using an attribute vector of each user and a Euclidean distance between the attribute vector of the user and a centroid, wherein the computer program product further comprises computer instructions for obtaining, by the server, the first hot clip and the second hot clip based on information about operations performed by each of the plurality of user groups in watching the video content, wherein the operations performed by each of the plurality of user groups comprise fast forward, rewind, forward drag, and backward drag, wherein if at least one user of the plurality of user groups performs the fast forward operation or the forward drag operation on a video clip of the video content, a negative contribution is made to a popularity contribution value of the video clip, wherein if the at least one user of the plurality of user groups performs the rewind operation or the backward drag operation on the video clip of the video content, a positive contribution is made to the popularity contribution value of the video clip.

12. The non-transitory computer readable medium of claim 11, wherein the operations performed by each of the plurality of user groups comprise a bullet screen comment.

13. The non-transitory computer readable medium of claim 11, wherein the first tag is used to indicate a start time of the first hot clip and the second tag is used to indicate a start time of the second hot clip.

* * * * *

UNITED STATES PATENT AND TRADEMARK OFFICE
CERTIFICATE OF CORRECTION

| | | |
|---|---|---|
| PATENT NO. | : 11,265,624 B2 | |
| APPLICATION NO. | : 16/495175 | |
| DATED | : March 1, 2022 | |
| INVENTOR(S) | : Pengfei Zhou et al. | |

It is certified that error appears in the above-identified patent and that said Letters Patent is hereby corrected as shown below:

In the Claims

Column 31, Claim 6, at the end of Line 44, please add a ";"

Signed and Sealed this
Seventh Day of June, 2022

Katherine Kelly Vidal
*Director of the United States Patent and Trademark Office*